United States Patent [19]

Grimm et al.

[11] Patent Number: 5,680,151
[45] Date of Patent: Oct. 21, 1997

[54] METHOD AND APPARATUS FOR TRANSMITTING VIDEO, DATA OVER A COMPUTER BUS USING BLOCK TRANSFERS

[75] Inventors: Dennis L. Grimm, Fremont; Erik A. Gutfeldt, Palo Alto; Gregory M. Millar, Pleasanton; Terence E. Worley, Fremont, all of Calif.

[73] Assignee: Radius Inc., Sunnyvale, Calif.

[21] Appl. No.: 192,844

[22] Filed: Feb. 7, 1994

Related U.S. Application Data

[63] Continuation of Ser. No. 537,051, Jun. 12, 1990, abandoned.

[51] Int. Cl.[6] .................................................. G06F 12/28
[52] U.S. Cl. .................... 345/119; 345/120; 348/552; 395/853; 395/850; 395/889; 395/162
[58] Field of Search .................... 395/800, 200.1, 395/135, 162, 881, 880, 889, 885, 850, 853; 273/1; 382/45; 364/413.23; 358/17, 200; 345/186, 190, 120, 122; 348/565, 522, 552

[56] References Cited

U.S. PATENT DOCUMENTS

| | | | |
|---|---|---|---|
| 4,417,276 | 11/1983 | Bennet et al. | 358/160 |
| 4,754,331 | 6/1988 | Wojcik et al. | 358/160 |
| 4,769,636 | 9/1988 | Iwami et al. | 340/724 |
| 4,783,648 | 11/1988 | Homma et al. | 340/724 |
| 4,800,431 | 1/1989 | Deering | 358/160 |
| 4,874,164 | 10/1989 | Miner et al. | 273/1 |
| 4,876,598 | 10/1989 | Carlstedt et al. | 358/160 |
| 4,949,169 | 8/1990 | Lumelsky et al. | 358/86 |
| 4,975,960 | 12/1990 | Petajan | 381/43 |
| 4,994,912 | 2/1991 | Lumelsky et al. | 358/140 |
| 5,021,873 | 6/1991 | Abumi | 358/21 |
| 5,025,249 | 6/1991 | Seiler et al. | 340/721 |
| 5,027,212 | 6/1991 | Marlton et al. | 358/183 |
| 5,046,042 | 9/1991 | Nitatori et al. | 364/900 |
| 5,119,082 | 6/1992 | Lumelsky et al. | 340/731 |
| 5,151,977 | 9/1992 | Bailey et al. | 395/800 |
| 5,193,148 | 3/1993 | Alcorn et al. | 395/157 |
| 5,227,863 | 7/1993 | Bilbrez et al. | 358/22 |
| 5,229,852 | 7/1993 | Maietta et al. | 358/140 |
| 5,249,164 | 9/1993 | Koz | 358/21 |
| 5,305,436 | 4/1994 | Mundkur | 395/162 |
| 5,327,293 | 7/1994 | Maietta et al. | 348/565 |

OTHER PUBLICATIONS

Nicoud, Jean–Daniel, "Video RAMs: Structure and Applications", IEEE Micro, Feb. 1988.

Battelle, John, "RasterOps to Show Graphics Accelerator", MacWEEK, Apr. 10, 1990.

Fraser, Bruce, "Color–Board 364 Covers All Bases: Single NuBus Board Puts Video on Mac", MacWEEK, Mar. 27, 1990.

Battelle; "Raster Ops to show graphic accelerator"; MacWeek Apr. 1990.

Primary Examiner—Larry D. Donaghue
Attorney, Agent, or Firm—Stuart P. Meyer

[57] ABSTRACT

A method and apparatus for transmitting video data over a standard personal computer bus optimizes the video data transfer rate of the bus by parsing the video data into appropriately sized and selected blocks. The video data blocks required for display are stored in a first-in first-out register, addressed, and sent over the data bus of the computer. Video data not required for display is discarded. The video data may be addressed to any location in the memory of the computer for display or further processing.

13 Claims, 23 Drawing Sheets

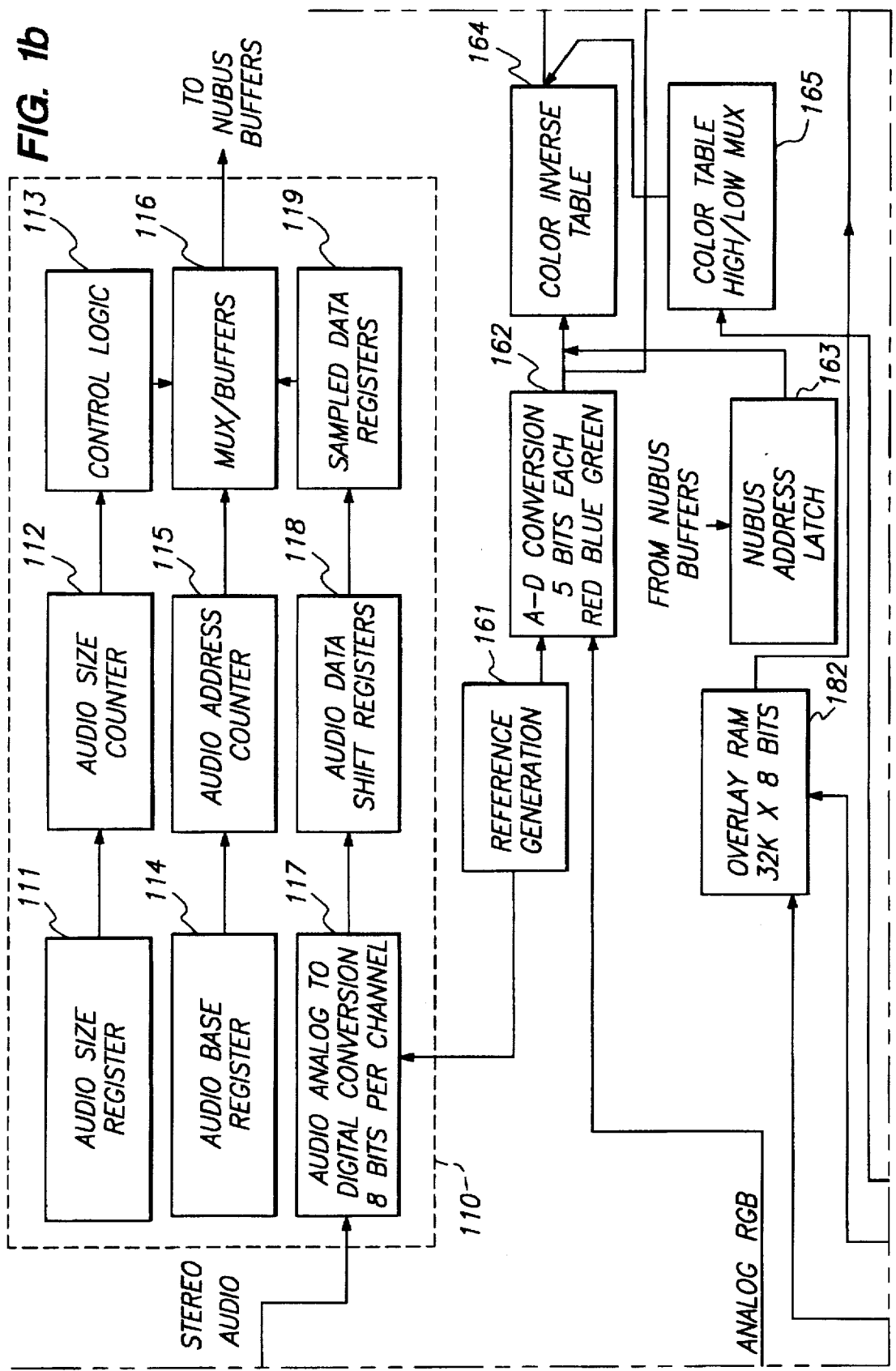

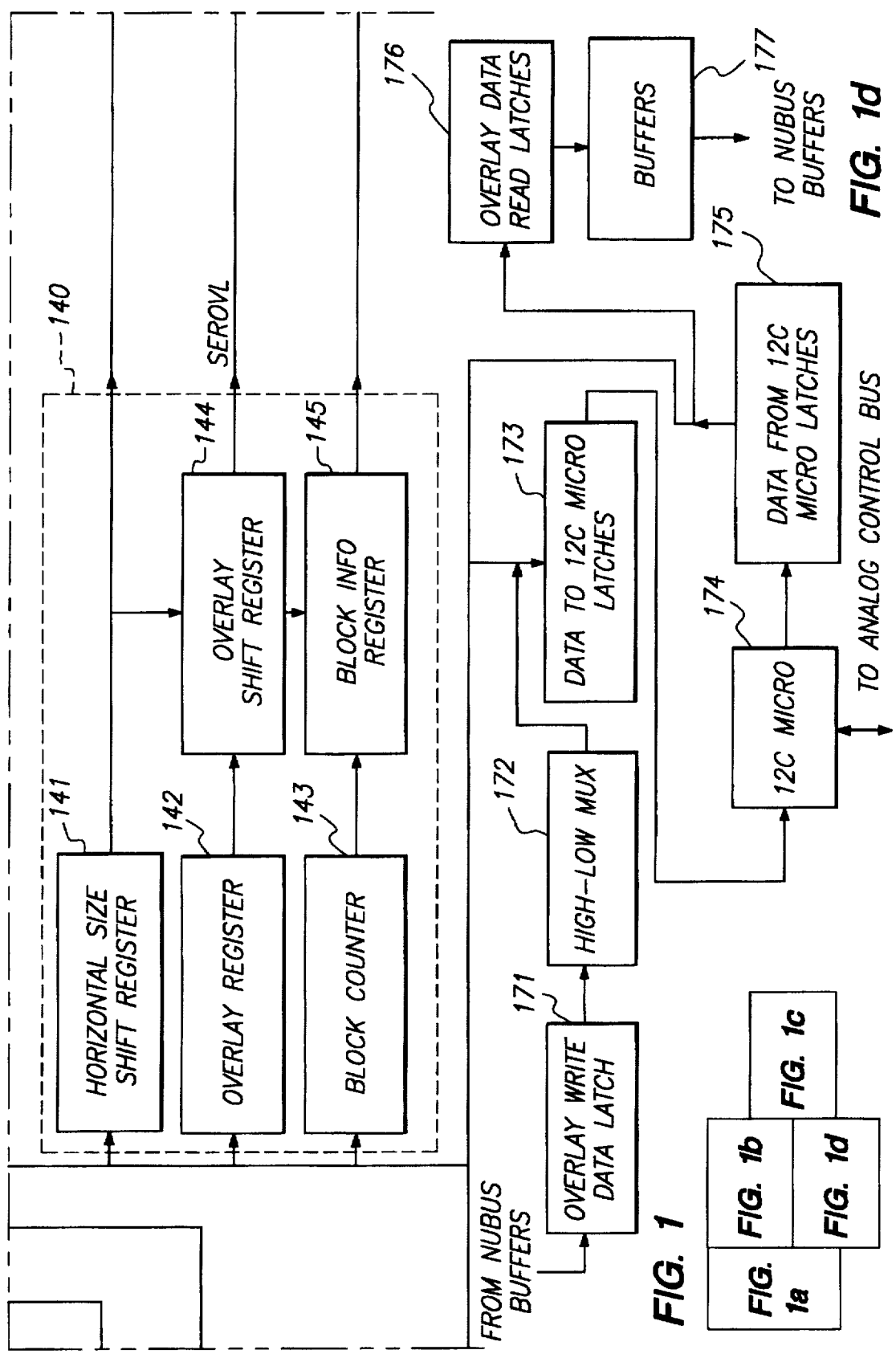

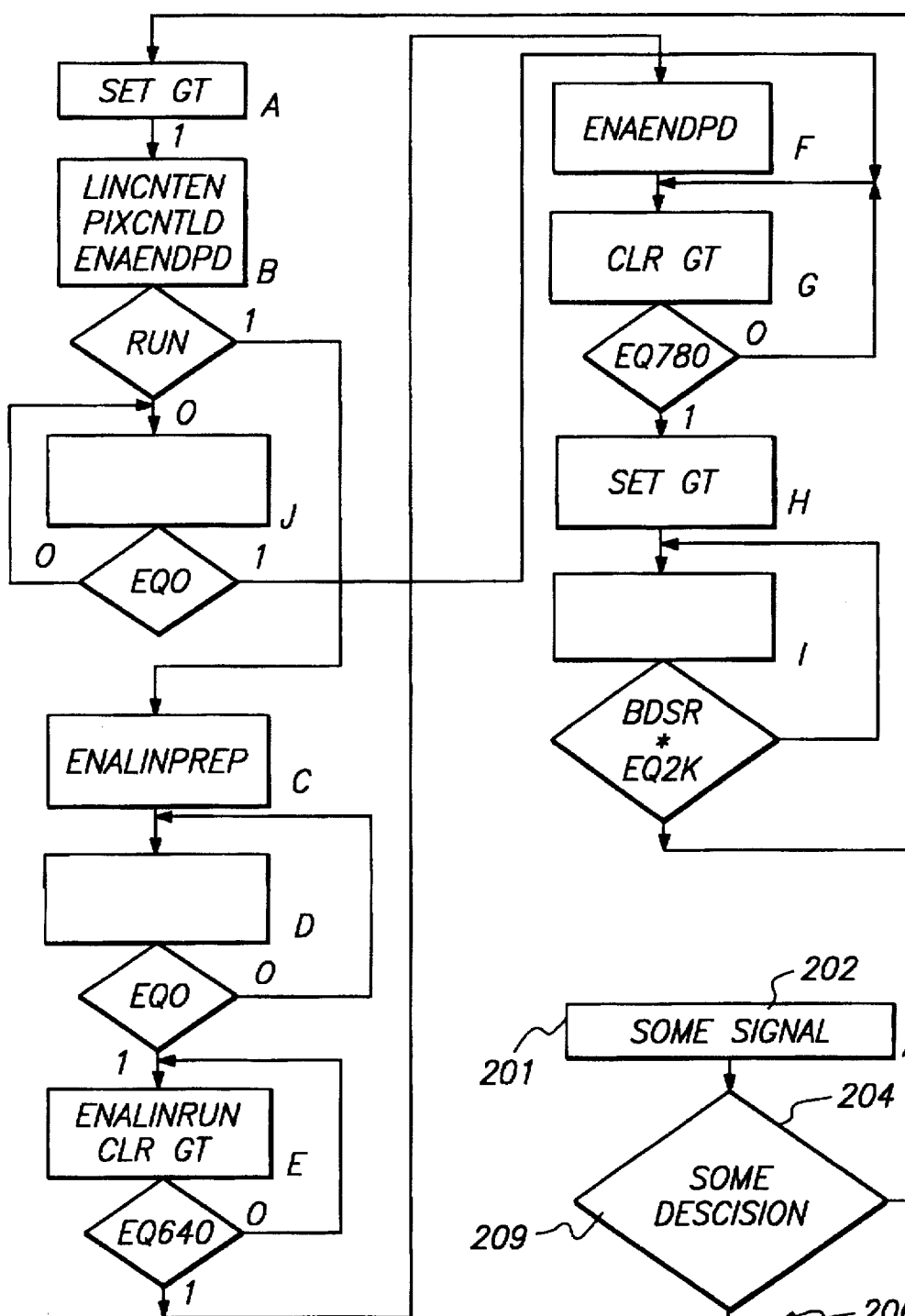
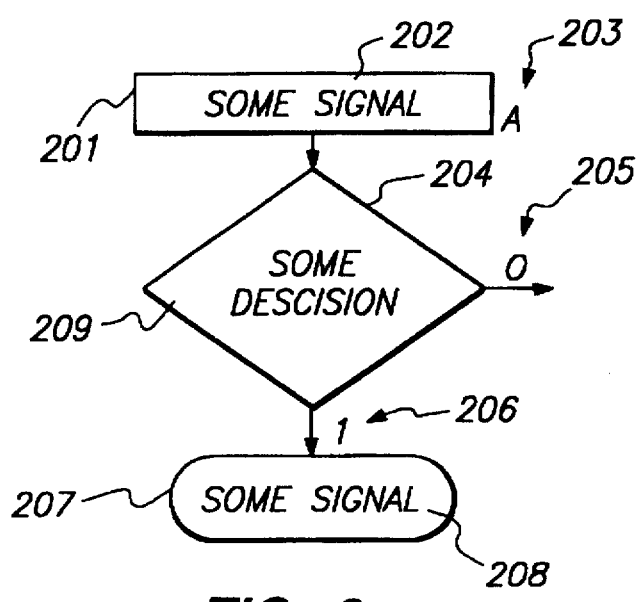
FIG. 2b
FIG. 2a

| FIG. 8a |
| FIG. 8b |

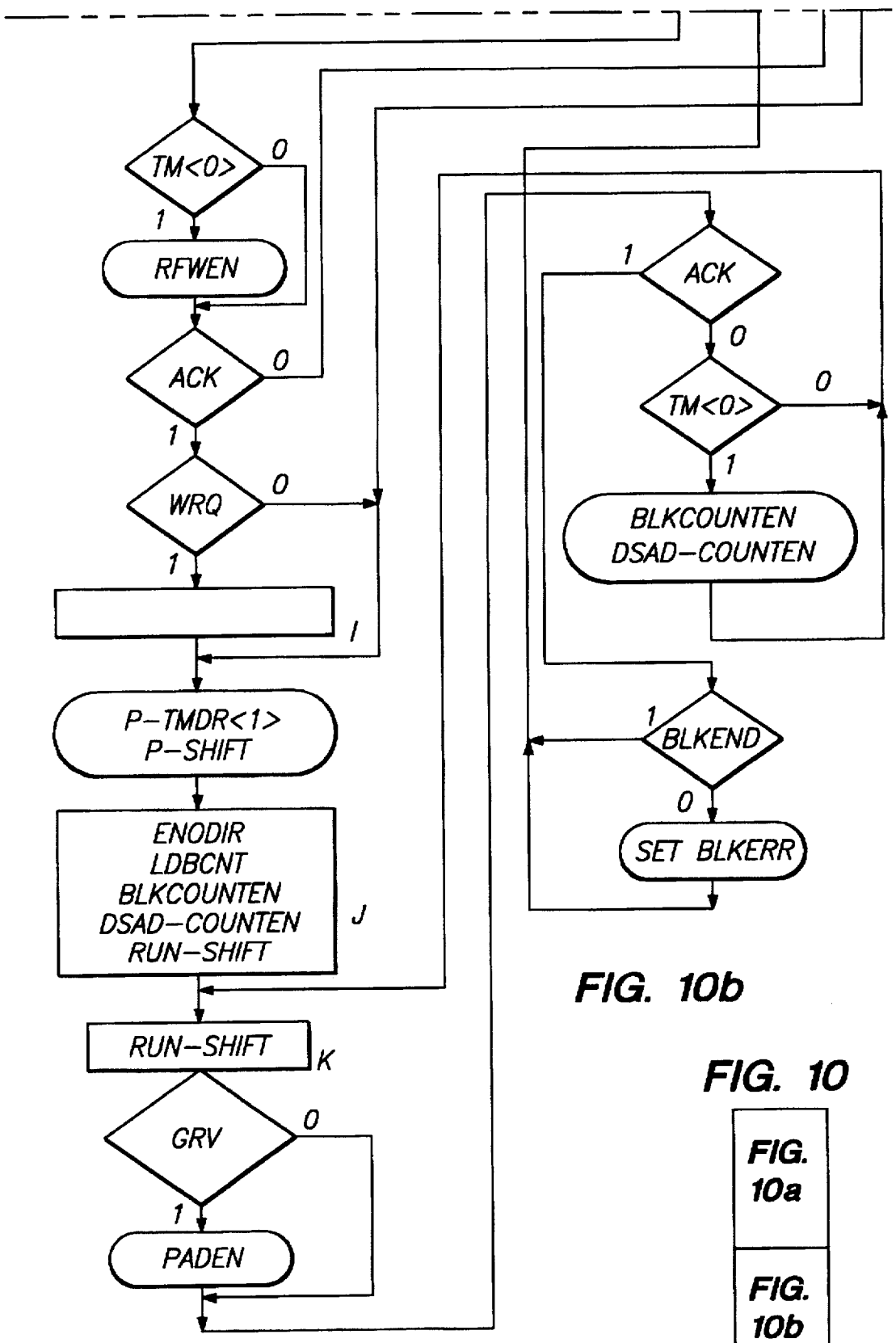

METHOD AND APPARATUS FOR TRANSMITTING VIDEO, DATA OVER A COMPUTER BUS USING BLOCK TRANSFERS

RELATED APPLICATION

This application is a continuation of U.S. patent application Ser. No. 07/537,051, filed Jun. 12, 1990, now abandoned.

37 C.F.R. §1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND FIELD OF THE INVENTION

This invention relates to the real time transmission of video information over a standard data bus in a personal computer.

A difficult problem has heretofore prevented the real-time delivery of digitized video data across a typical personal computer bus. The data transfer rate requirements of the digitized video, due to both raw bandwidth and color bit depth, approach the maximum data transfer bandwidth of the bus.

A number of schemes have been devised in the prior art to accomplish such video transmission over a computer bus. In one scheme, a large local memory is employed as a buffer to store several frames of video data, and the data is transferred gradually from these frames over the bus. Typically, one frame's worth of data is written to one memory storage area while another frame's worth of data is read from another memory storage area. Such a scheme allows complete frame transfers and distributes such transfers over the entire time span of a frame. However, this solution is often not feasible to implement for real-time capability, is intensive in the use of memory and typically has a high cost.

An alternate prior art video capture system requires the addition of a local video data bus of higher bandwidth, which transfers directly into a dedicated video frame buffer, not using the main computer bus. In this scheme, the main computer bus is not burdened with any overhead from the video transfer. However, the video can be displayed only on the portion of the computer's display system controlled by that frame buffer, and not on any arbitrary frame buffer in the computer system. Furthermore this system will work only with other hardware designed specifically for this video transfer scheme.

A third prior-art approach is to overlay the desired video image in the analog domain. This is similar to the "chroma keying" scheme used commonly in television newsrooms. In order to determine the size of the desired overlay, the video to be transferred is digitized, processed in the digital domain to fit within the desired window, converted back into analog and then superimposed over the video signal being sent to the display system of the computer. One disadvantage of this system is that it operates only with display hardware specially modified for this scheme. Another disadvantage is that such systems typically require interlaced (NTSC, "PAL" or "SECAM") rate display boards, which are ill-suited to the display of computer images without complex filter circuitry.

SUMMARY OF THE INVENTION

In accordance with the present invention, incoming analog video data is digitized and parsed into data packets appropriately sized for high-speed optimized data transfer. Appropriate selection of the parameters for such block transfers maximizes the usable bandwidth of the bus and makes possible the real-time transfer of video data on the existing bus of the computer. The data blocks are stored in a first-in first-out (FIFO) register for processing and transmission over the data bus.

In the preferred embodiment, a video data rate of approximately 25 megabytes per second is achieved while operating on a computer bus with a theoretical maximum data bandwidth of 32 Mhz. The preferred embodiment is implemented without the requirement for a large memory for storing the digitized video information. This permits a lower cost implementation than the prior art alternatives, while maintaining real-time transfer of video data over the existing bus of the computer.

In the preferred embodiment, the size of the image in the destination frame buffer may be reduced by selectively eliminating horizontal or vertical information. In the horizontal direction, the system decides on a pixel by pixel basis whether to load the pixel data into FIFO; if the data is unwanted in the target display, it is never loaded into the FIFO, and it is permanently lost. Vertical sizing is decided on a line by line basis. If a line is not desired, that line will be ignored in similar fashion.

The method and apparatus of the instant invention operate entirely within the bounds of existing operating system requirements, including, for example, movable and sizable windows, arbitrarily overlapping windows and a universal cursor. Thus, the method and apparatus of the instant invention are virtually transparent to the operating system, thus allowing the use of virtually any display hardware designed for operation with the existing operating system. Because the main data bus of the computer is used, any address in the computer system may be accessed. This allows the image to be distributed to arbitrary locations in computer memory, providing, among other things, the ability for special effects to be performed on the displayed data.

The method and apparatus of the present invention are tolerant of video signals of inferior quality, allow calibration of important parameters without manual adjustments to hardware, and also allow the system to use embedded information in video signals either for display or for automatic adjustment of the system itself.

Appendixes A and B include program information and commentary regarding operation of the present invention.

BRIEF DESCRIPTION OF THE DRAWINGS

FIG. 1 illustrates the arrangement of FIGS. 1a, 1b, 1c and 1d, which together provide an overall system block diagram of the preferred embodiment.

FIG. 1b provides a portion of an overall system block diagram of the preferred embodiment. FIG. 1d provides a portion of an overall system block diagram of the preferred embodiment.

FIG. 2a is an example state diagram illustrating the nomenclature used in the state diagrams of this disclosure.

FIG. 2b is a state diagram of the "Horizontal Sync" state machine of the preferred embodiment.

FIG. 10 illustrates the arrangement of FIGS. 10a and 10b, which together provide a state diagram of the "Bus Control" state machine of the preferred embodiment.

FIG. 10b provides a portion of a state diagram of the "Bus Control" state machine of the preferred embodiment.

FIG. 17 illustrates the arrangement of FIGS. 17a, 17b, and 17c, which together provide a diagram of data words for various color modes as used in accordance with the present invention.

DETAILED DESCRIPTION OF THE PREFERRED EMBODIMENT

Figure 16:
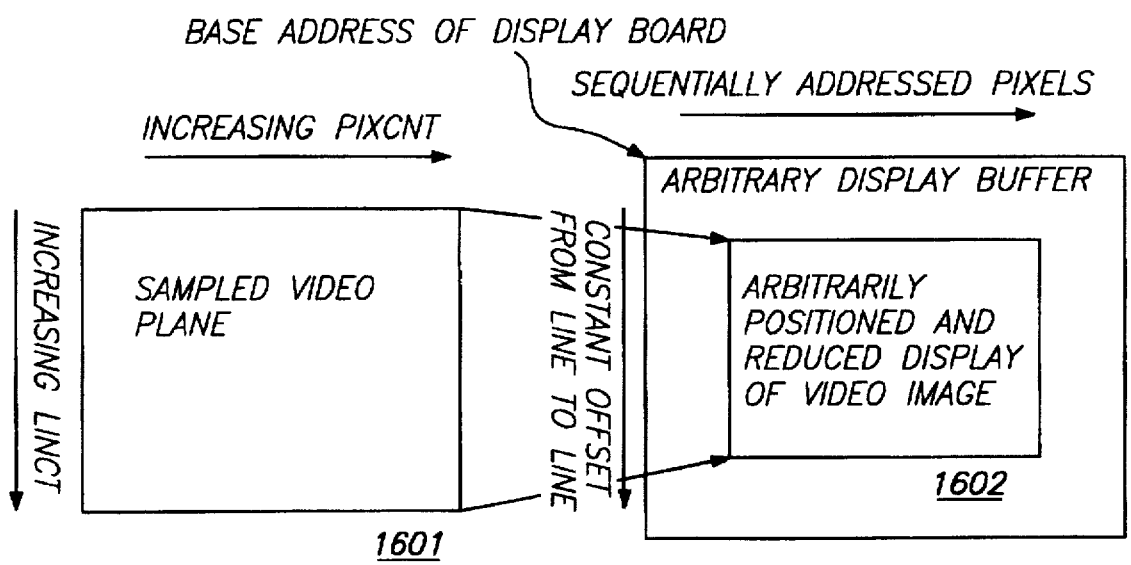
FIG. 16 is an illustration of the overall system function of the preferred embodiment.

Referring now to FIGS. 1, 1a, 1b, and 1d an overall system block diagram of the preferred embodiment is shown. Referring also to FIG. 16, two coordinate planes are defined in analyzing the operation of the preferred embodiment. The "source" plane 1601, which is the display plane of the incoming video signal, is of fixed size, and the parameters of the source plane 1601 are determined by the video standard to which the source plane 1601 adheres. The "destination" plane 1602 is the display plane of the processed video data placed on the computer bus in accordance with the present invention. The video information on the destination plane 1602 may be significantly resized and otherwise altered compared with the video information on the source plane 1601.

The preferred embodiment operates on the "nubus" computer bus used in Macintosh personal computers from Apple Computer, Inc., but other embodiments could be implemented, in accordance with the present invention, for use with other computer buses.

In Macintosh-compatible display systems, video data is stored in memory that is mapped to the display such that the lowest address is top-left portion of the display. Pixels to the right of the top-left portion of the display have contiguously increasing addresses with a predetermined number of bits representing each pixel. The preferred embodiment operates on systems using 8, 16 or 32 bits per pixel.

Figure 17A:
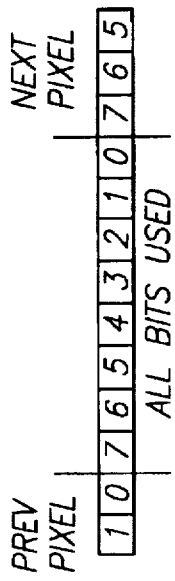
FIG. 17a provides a portion of a diagram of data words for various color modes as used in accordance with the present invention.
Figure 17B:
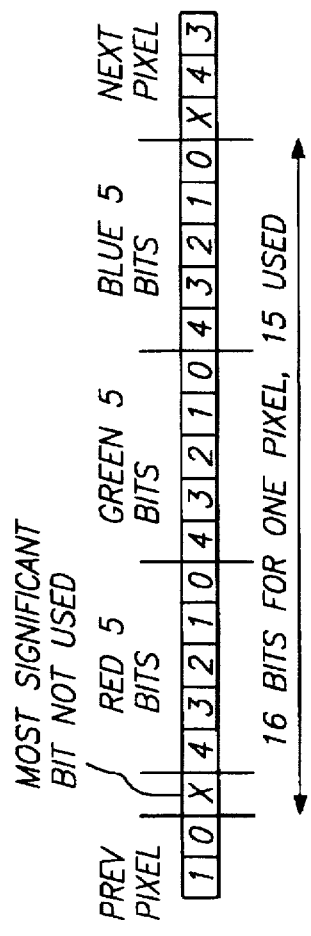
FIG. 17b provides a portion of a diagram of data words for various color modes as used in accordance with the present invention.
Figure 17C:
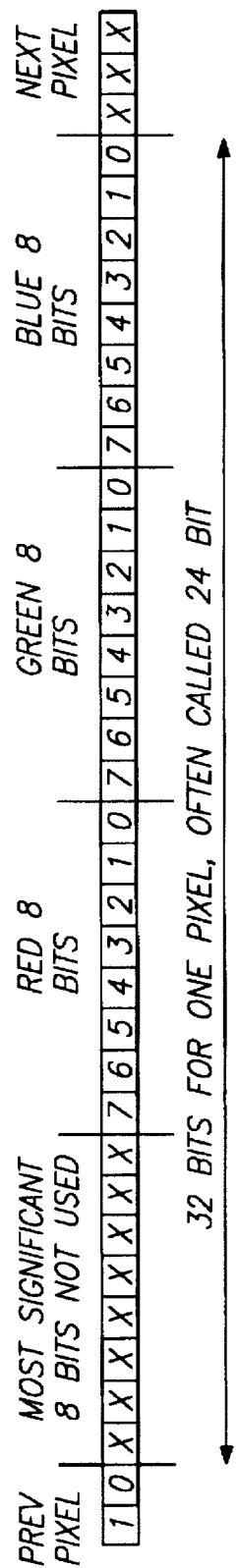
FIG. 17c provides a portion of a diagram of data words for various color modes as used in accordance with the present invention.

Referring now to FIG. 17a, the 8 bit per pixel mode indexes a table, or "color palette", to determine the display color. The table used in 8 bit mode is determined by the operating system of the computer. Referring now also to FIG. 17b, in 16 bit mode, 5 bits each are used to define the red, green and blue components of the pixel, and one bit is unused. Referring now also to FIG. 17c, in 32 bit mode, 8 bits each are used to define the red, green and blue components of the pixel, and 8 bits are unused. Display buffers used in these systems are typically connected to the main data bus of the computer, in this case the "nubus" data bus. Nubus allocates no more than 24 bits of address range for any plug-in board, and can support data block transfers of 2, 4, 8 or 16 of the 32-bit long words per block. The upper bandwidth limit for the nubus architecture is theoretically 33 Megabytes per second.

The operating system of the Macintosh computer typically displays informations in "windows" on a display screen. A plurality of windows may be displayed. Windows are arbitrarily positionable and sizable, and may arbitrarily overlap one another. Windows may have an arbitrarily complex set of visible pixels. Pixels must, however, each have equal vertical and horizontal dimensions.

All nubus data transfer cycles, whether block transfer or not, are initiated by a "START" signal and ended by an ACK signal. For non-block transfers, the data address is put on nubus address-data (AD) lines, and the data itself is put on these same lines when the ACK signal is activated. For block transfers, the intermediate long words of data are individually acknowledged by the bus "slave" device asserting a signal "TM<0>". At the transfer of the last long word of a block, both "ACK" and "TM <0>" are asserted to end the cycle.

Figure 1A:
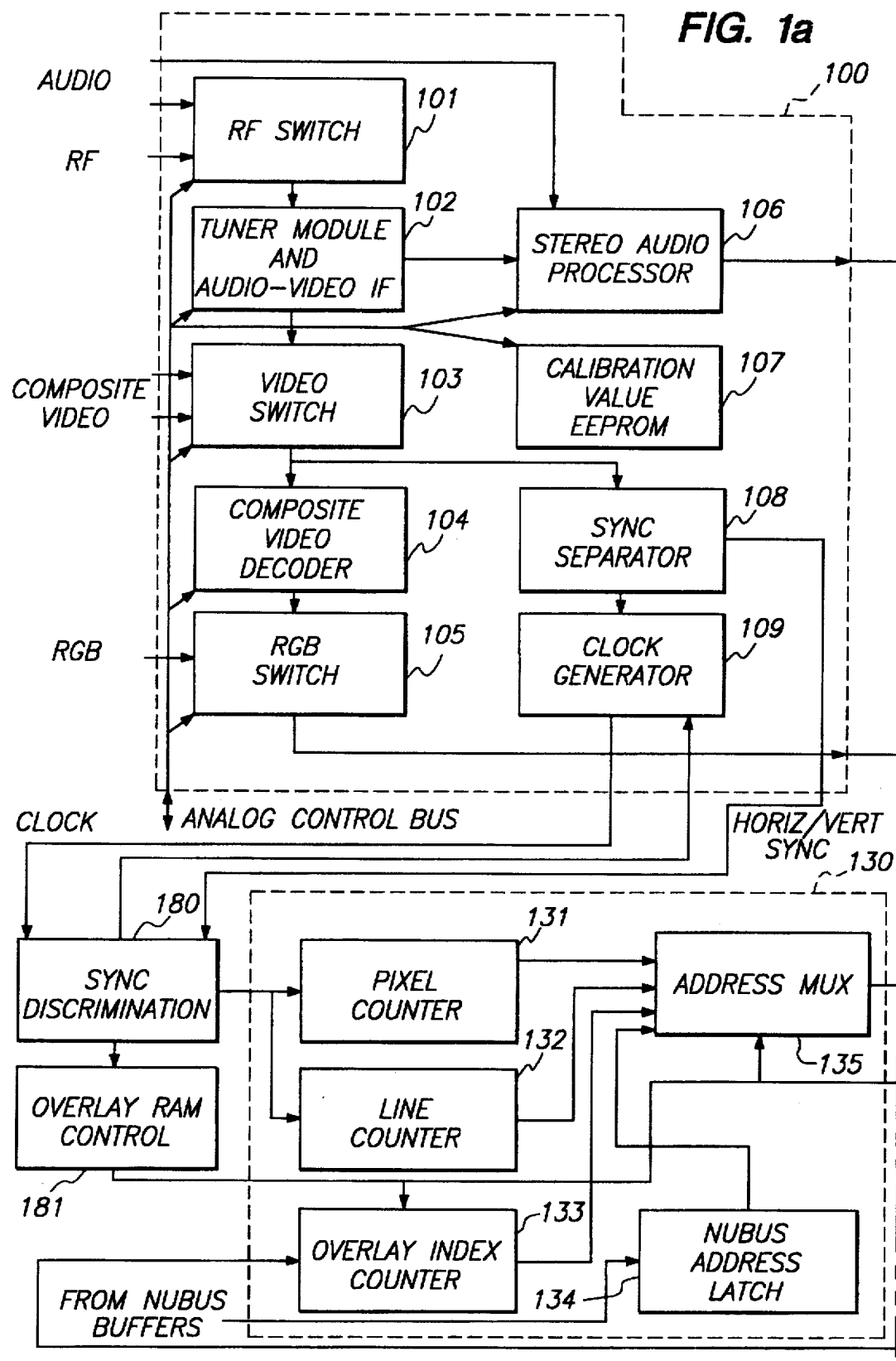
FIG. 1a provides a portion of an overall system block diagram of the preferred embodiment.
Figure 1C:
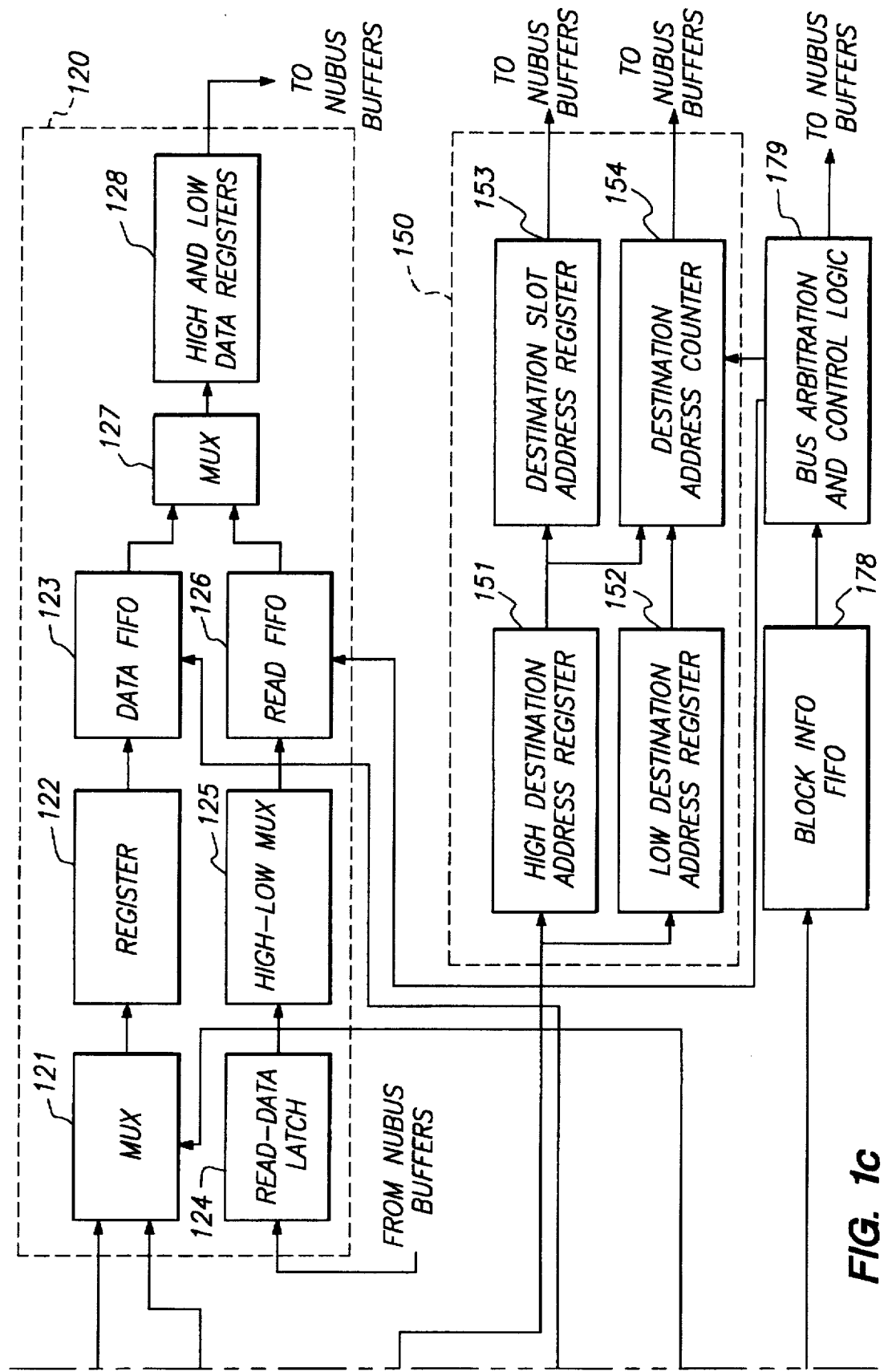
FIG. 1c provides a portion of an overall system block diagram of the preferred embodiment.

The preferred embodiment is comprised of six major subsystems. Referring now also to FIG. 1a, the external analog box 100 performs preliminary processing on audio and video signals. Referring now also to FIG. 1b, the audio section 110 digitizes audio information and prepares it for placement on the computer bus. Referring again to FIG. 1a, the overlay RAM address generation subsystem 130 processes digital information to determine which portions of the video display window will be "overlaid" by other windows, by the cursor, or by other display elements, so that the corresponding blocks of digital video information need not be placed on the computer bus at all. Referring now also to FIG. 1d, the overlay data block system 140 processes data such that blocks including some overlaid data and some non-overlaid data are properly displayed. Referring now also to FIG. 1c, the destination address generation subsystem 150 determines the appropriate location in the destination plane for current data and writes it to the computer bus. The data path subsystem 120 reads digitized video data at the input video rate and writes the processed data to the computer bus at the rate required by the computer's operating system.

The external analog box subsystem 100 processes and decodes incoming signals. This subsytem is comprised of nine major modules. The RF switch module 101 allows selection among multiple RF sources, such as cable television sources and antenna systems. The tuner and audio-video IF module 102 processes the selected RF source and separates out the constituent video and audio components. The stereo audio processor 106 switches, control, filters the audio signal component. The video switch 103 allows selection among multiple composite video signals. The composite video decoder 104 and sync separator 108 operate to extract the RGB signals and synchronization signals. The synchronization signals from block 108 are simply HSYNC (horizontal sync) and VSYNC (vertical sync). The sync discrimination block 180 controls a horizontal and a vertical counter 131 and 132, respectively, in response to HSYNC and VSYNC. The count of the pixel counter 131 represents the count of the current pixel within the line and is called PIXCT. The count of the vertical counter 132 represents the count of the current line and is called LINCT. Therefore, these counters represent the coordinates of the current pixel in the source coordinate plane 1601. The clock frequency and pixel count size are selected to match the standard video specification EIA RS170-A for composite video, with 486 active lines and a 3×4 aspect ratio. The preferred embodiment displays a nominal 480 active lines of 640 pixels each. The active video line is a minimum of 52.46 micro seconds, requiring a nominal sampling rate of 12.2 MHZ. The RGB switch 105 allows selection among multiple RGB video signals. The clock generator 109 creates a clock signal responsive to the synchronization signal of the video data and feedback from sync discrimination block 180. The external analog box 100 also allows digital control of audio volume, balance, treble, bass, video contrast, brightness, color level and color hue, and the like.

The audio section 110 is comprised of nine major modules. The module 117 converts the analog audio signal to a digital signal. The audio is digitized to 8 bits per channel at a sampling rate of 22.27 kHz. This rate is roughly compatible with the audio standard used in Macintosh personal computers. A four-pole active low pass filter (within module 106) with a cutoff frequency of 7 kHz is used for anti-aliasing purposes. The audio data shift registers 118 convert the serial output of module 117 to parallel. The sampled data registers 119 group bytes of audio data together to form 32 bit data words. Audio size register 111 and audio base register 114 are initialized by software and serve to preload the audio size counter 112 and the audio address counter 115, respectively. The audio size counter 112 is sequentially incremented until a top-level carry out occurs, at which time both counters 112 and 115 are re-loaded with their initial values from registers 111 and 114, respectively. The address counter 115 counts sequential addresses to which the audio data is to be sent. The driver software of the preferred embodiment allocates a block of memory from the operating system of the computer for use as an audio buffer. In the preferred embodiment, a 32 k byte block of memory is used, but other sizes could be used as well. The driver software sets the audio base register 114 to the address of the audio buffer. The driver software also sets the audio size register 111 with the negative of the buffer size, −32 k. The size counter 112 counts positively from this number until a carry out is produced, flagging the end of the buffer. The driver software also initiates sampling of the audio, and calls an operating system routine to play back the sound stored in the audio buffer. Audio data is first stored in a portion of the audio buffer, and then the operating system is called to access that area for playback. When the end of the buffer is reached, the computer will generate an interrupt, which the driver software will service so as to cause audio data to be written to, and retrieved from, the beginning of the buffer again. Thus, audio playback may be nearly continuous. Alternatively, the digital audio data could simply be stored in contiguous blocks of memory for playback at a later time. Control logic module 113 and multiplexer/buffer module 116 allows the audio data and addresses to be placed onto the computer bus.

The analog video signal from the RGB switch 105 of the external analog box 100 is digitized to five bits each of red, green and blue by the analog-to-digital converter 162. Both this converter 162 and the audio converter 117 obtain a D.C. reference voltage from the reference generator 161. The digitized video signal from converter 162 is processed by the color inverse table module 164. This module operates only on video data in eight bit-per-pixel mode. The module 164 comprises a small block of random access memory (RAM) with the digitized 15 total bits of red, green and blue providing an address to the table, and the output being eight bits that correspond to the "color palette" entry of the closest color represented by the input. The driver software must be able to read and write the color table ram 164. Therefore, there is circuitry provided for the color table 164 to be addressed as nubus slave. This consists of a nubus address latch 163, and the color table 164 high/low multiplexer 165. This address latch 163 latches the address from nubus when the color table 164 is addressed. (by the driver software). This then becomes the address for the color table 164 and the a-d converters 162 which normally provide address for the table 164, are kept disabled. When the table 164 is being written, the data is passed first through the overlay ram data bus as follows. First the data is latched in the overlay write data latch 171. Next the 32 bit word in the latch 171 is placed on the overlay data bus as two sequential 16 bit words by the overlay ram high-low multiplexer 172. Each 16 bit word is placed on the color table data bus as two sequential 8 bit words by the color table high low multiplexer 165. Thus the original 32 bit data word from latch 171 ends up as a total of 4 8-bit words at the color table. The reason for using the overlay data path for this purpose is that hardware must be provided for folding 32 bits into 16 bits for the overlay ram 182, and it is easier to make 16 bits into 8 bits than to make 32 bits (nubus data width) into 8 bits. To read information from the color inverse table 164, the data is sent through the data path subsystem 120 and placed on the bus. Signals from the bus arbitration and control logic 179 ensure that such data is not considered live video for display. The driver software updates the information in the color inverse table 164 to match whatever color palette is currently active under the operating system.

The data path subsystem 120 comprises eight major modules. The multiplexer 121 selects whether to use the output of the color inverse table module 164 for video data or to directly use the output of the video converter 162 for video data. If operating in eight bit-per-pixel mode, the color table module 164 output is used. Otherwise, the output of the video converter 162 is used. Next, the data is combined with appropriate overlay data from the overlay shift register 144. This is accomplished by associating a ninth bit with each pixel if operating in eight bit-per-pixel mode. If operating in 16 or 24 bit mode, the overlay data is put in the most significant bit of the data word and the 9th bit is set such that multiplexer 127 will not select the read FIFO 126. The resulting data from register 122 is loaded into the data FIFO module 123, either 9 or 18 bits at a time, depending upon whether operation is in 8 bit-per-pixel mode or 16 or 24 bit-per-pixel mode, respectively. The data FIFO module has two major purposes. The first is to provide an interface between the "input" half of the system that operates at a clock rate synchronized to the input video and the "output" side of the system that operates at the computer bus system clock rate. The second is to act as a data buffer by storing at least one entire data block before requesting a bus cycle. This buffering function is required because the bus specification does not allow any delay by a hardware module that has asserted control of the bus (a bus "master") once an operation such as a data block transfer has been initiated. Each next 32 bit data word must be placed on the bus by the master one clock cycle after the preceding word has been received and acknowledged by the bus slave.

Figure 13:
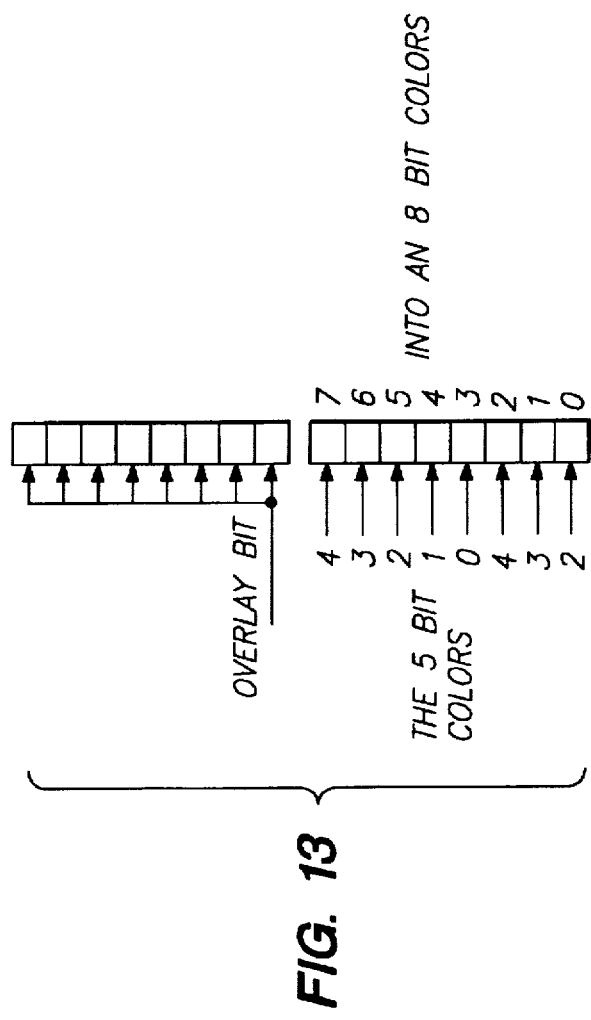
FIG. 13 illustrates the data bit mapping of 24 bit color mode in the preferred embodiment.

The data path subsystem 120 also includes a read data latch 124, multiplexer 125 and read FIFO 126 to extract video data relating to portions of the display that will overlap the video data being processed by the preferred embodiment. For instance, a computer display window may partially overlay the active video window, a cursor may overlay another portion of the video, and so forth. In eight bit-per-pixel mode, this video information from other portions of the computer system must be overlaid, on a pixel-by-pixel basis, upon the video data being processed by the preferred embodiment. The latch module 124 is a 32 bit read data latch that stores intermediate long words of a data block. The multiplexer 125 is used to convert the 32 bit words from latch module 124 into words of 16 bit width. The read FIFO module 126 then reads these words and stores them in the same manner as the data FIFO module 123. In eight bit-per-pixel operation, the multiplexer 127 reads data either from the data FIFO 123 or the read FIFO 126, depending upon the state of the overlay bit stored in the ninth bit of each data byte. In 16 and 24 bit mode, the ninth bit is always set to select data from the data FIFO 123, since overlay is handled in a different manner. Every two 16 bit words from the multiplexer 127 are combined in the data register 128 to form a 32 bit word for transmission over the computer bus. This process is slightly different in the case of 24 bit-per-pixel operation, where a single 16 bit data word (5 bits each of red, green and blue data and one "overlay" bit) is mapped onto a 32 bit word using an algorithm that provides the best fit of 31 levels into 255 levels. In 24-bit per pixel mode, there are 8 bits of information for the red, green and blue information as illustrated in FIG. 17c. The video information in the preferred embodiment only samples 5 bits of red, green and blue. The typical way this is handled is to place the 5 bits into the top 5 bits of the 8 bits, and leave the least significant bits of the 8 bits at a logic zero level. This is equivalent to shifting the binary number three bits to the left (toward the more significant bits). In this scheme a zero in the five bits will result in a zero in the 8 bits. The problem is that a maximum value (value of 31 in 5 bits, or binary 11111) will result in an 8 bit value of 248 (binary 11111000) instead of the 8 bit maximum value of 255 (binary 11111111). This results in an image of reduced dynamic range (darker). In the preferred embodiment, as illustrated in FIG. 13, the five bit colors are transformed into 8 bits by routing the most significant 3 bits of the 5 bit value to both the most and least significant bits of the 8 bit word. This is equivalent to multiplying the 5 bit value by 33/4 and rounding down to the next integer. Note that this is a linear transform. When the five bit value is zero, the 8 bit value will also be zero. When the 5 bit value is at a maximum (31), the 8 bit value is 255 (31×33/4=255.75, rounded down to 255), the maximum 8 bit value. Therefore, because the two extremes of the scale are correct and the transformation is linear, the intermediate values must be the best fit. This routing of the bits is equivalent to multiplying by 33/4 and rounding down. First shifting a binary number to the left by one bit is equivalent to multiplying by two. Shifting a binary number to the right is equivalent to dividing by 2. If while shifting to the right, the bits that are shifted off the end are ignored, it is equivalent to rounding down to the nearest integer. Therefore, multiplying by 33 (binary 100001) is equivalent to taking the binary number, shifting to the left 5 bits (multiplying by a binary 100000, or 32) and adding it to the 5 bit number without shifting (multiply by 1). Because multiplication is distributive over addition, if X is the 5 bit number (X×32)+(X×1)=X×(32+1)=X×33. Multiplying by 32 always leaves the least significant 5 bits zero, therefore adding a 5 bit number will simply replace those zeros with the five bit number. At this point, there are 10 bits of information. Dividing by 4 is simply shifting to the right by 2 bits, and discarding the bits shifted off. This ends up being 8 bits.

The output of the data register 128 is video data completely compatible with operating system requirements. This data is written under the control of the bus arbitration and control block 179 (path not shown) over the nubus to an address generated by the destination address generation subsystem 150.

Figure 12:
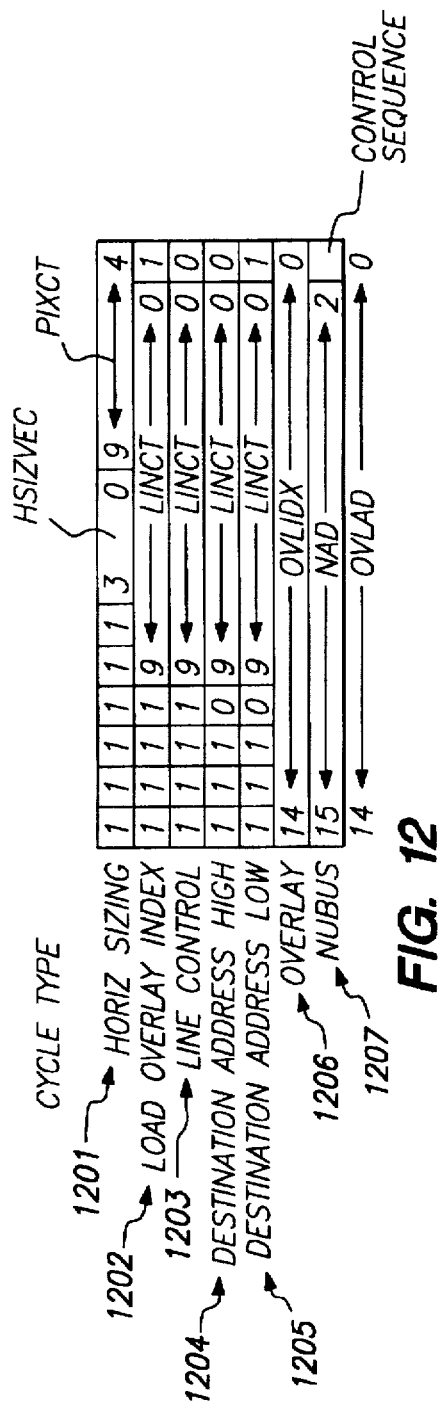
FIG. 12 is a truth table showing various address modes used in the preferred embodiment.
Figure 14:
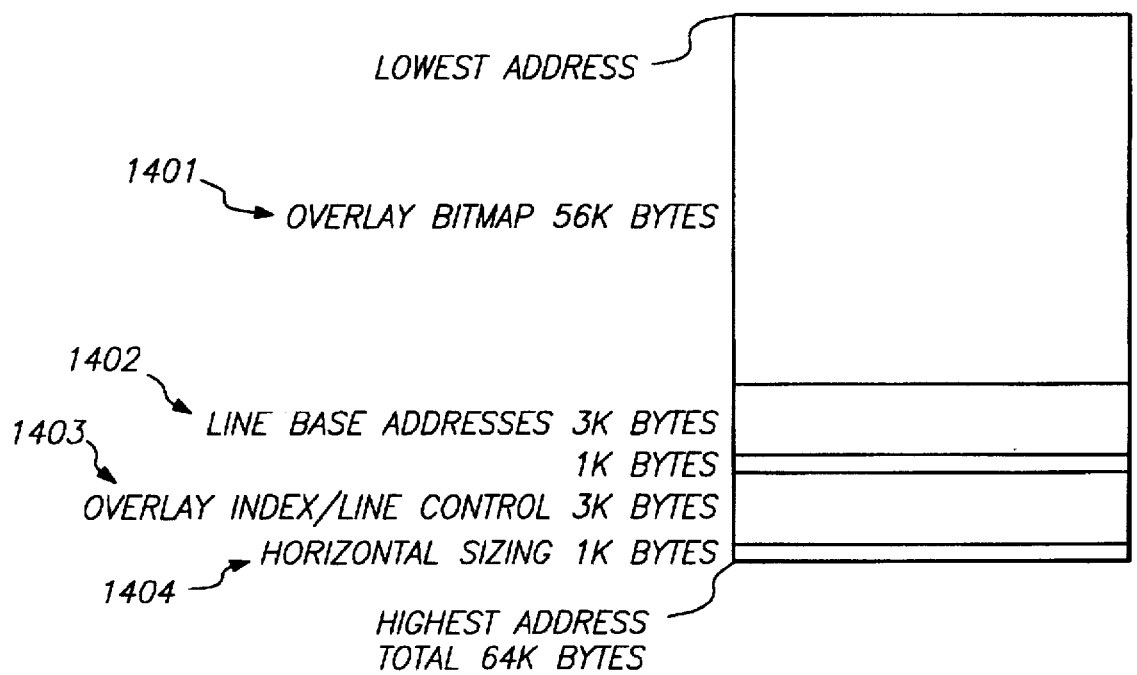
FIG. 14 is an address map of the overlay random access memory of the preferred embodiment.
Figure 15:
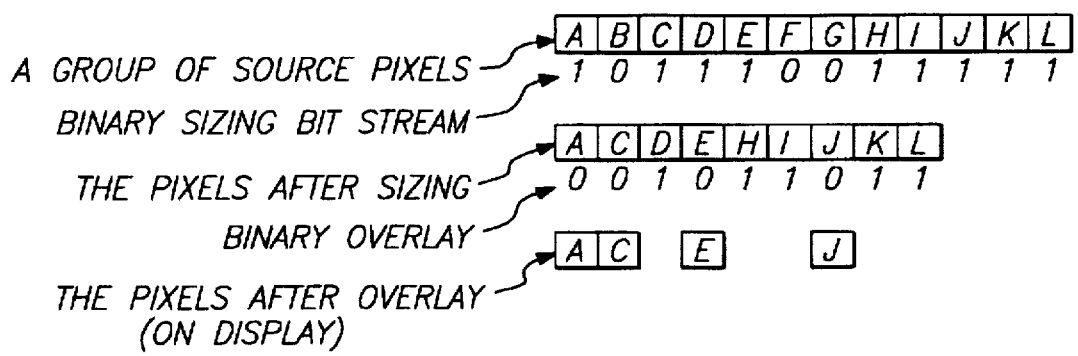
FIG. 15 is an illustration of the application of horizontal sizing and overlay in accordance with the present invention.

The overlay RAM address generation subsystem 130 has five major modules. The address multiplexer 135 selects any of four possible address sources: the pixel counter module 131, the line counter module 132, the overlay index counter module 133, and the bus address latch module 134. Referring also to FIG. 14, the overlay RAM 182 connected to the multiplexer 135 stores data related to areas of destination plane display overlap, the addresses for such data which are determined by the overlay RAM address generation subsystem 130. FIG. 12 shows the logic diagram of the overlay ram address mux 135. Referring to FIGS. 12 and 14, there are 7 types of cycles into and overlay ram. When the control block 181 is performing a read from the overlay bitmap 1401, it switches the address mux 135 to be in the overlay mode 1206. In this mode all 15 bits of the overlay ram address (OVLAD in the bottom of FIG. 12) are from the overlay index counter 133 (OVLIDX in FIG. 12). When the control block 181 is reading a line base address 1402, it must make two reads from the ram, because the ram is 16 bits wide, and an address is 32 bits wide. While reading the low and high 16 bits of a line base address, the control block sets the address multiplexer 135 to destination address LOW 1205 and destination address HIGH 1204, respectively. In these two modes, the most significant 3 bits are ones and the next most significant bit is a zero, the next ten bits are obtained from the ten bits of the line counter 132 (called LINCT in FIG. 12), and the least significant bit is first 1 then 0. Similarly, when the control block 181 is reading the overlay index and line control 1403, the address multiplexer 135 is set to load overlay index 1202 and line control 1203 modes. Here LINCT is still the middle bits of the overlay ram 182 address, but bit 11 is a one instead of a zero. When the control block 181 is reading horizontal sizing information 1404, the address mux 135 is set in the horizontal sizing mode 1201. In this mode the most significant 6 bits are ones, the next three bits are the three bits of the horizontal sizing register (called HSIZVEC in FIG. 12, as explained in further detail later) and the least significant bits are from the pixel counter 131. Note that the least significant bits of the pixel counter are not used. This is because there are 16 bits of horizontal sizing information in each location of address range 1404. Therefore, there is one address for each block of 16 pixels. The least significant bits of the pixel counter 131 therefore determine which bit within the 16 bits of horizontal sizing information corresponds to the current pixel. Finally when the driver software needs to load and maintain the data in the ram 182, it performs nubus read and write cycles. For these accesses to overlay ram 182, the memory is addressed as a nubus slave. As such, when the block 181 is not using the memory for any other purpose, the address mux 182 is put in the nubus state 1207. In this state the 14 most significant bits of the overlay ram address are simply the latched nubus address from the nubus address latch 134. Because nubus is 32 bits wide and the overlay ram data bus is only 16 bits wide, a single nubus cycle may affect two locations in overlay ram 182. The least significant bit in 1207 is toggled to specify whether the first or second half of a nubus address is active. Overlay allows the driver software of the preferred embodiment to control visibility of the destination image on a pixel by pixel basis. If a pixel is invisible, it will not be written to the display buffer, leaving any portion of a computer generated image in that pixel intact. The overlay mechanism is different depending on the display mode. A difficulty arises from the fact that nubus block transfers cannot be stopped or started at arbitrary addresses. Furthermore, information within the block cannot be selectively written. In 16 and 24 bits-per pixels modes there are unused data bits which are not used for display data. These bits are used as a write disable within a block. This is compatible with the operating system because the operating system always sets these bits to zero. In 8 bit-per-pixel mode, there are no unused bits. Therefore in 8 bit mode blocks are handled in a read-modify-write mode. The entire block is read from the display board. This data is used as background information. The video information is overlaid onto the background information and the entire block is written.

The overlay information (i.e., which destination pixels are to be written and which left alone) is stored as a bit map 1401 in a small local memory called the overlay RAM 182. The bit map is mapped 1:1 to the destination coordinate plane and therefore has to be large enough to have one bit per pixel of the maximum size destination image. The left over portions stored in the RAM 182 are used to store other information as follows: each source line has a 16 bit control word, a 16 bit offset of the beginning of that line into the overlay portion of the RAM 1403, a 32 bit starting address of that line in the destination coordinate plane 1402, and finally several (8) horizontal sizing bit streams 1404, as described later herein in greater detail.

There are 6 bits of the possible 16 used in the line control word. These are the vertical sizing bit, an overlay disable, a horizontal sizing disable and a 3 bit pointer (called HSIZVEC) to the one of 8 horizontal sizing strings 1404. Many other control functions could be stored here. Some ideas are a display bit depth per line, or perhaps an alternate color table per line.

The horizontal sizing bit strings 1404 map as one bit per source pixel in a given line. All lines (which use the same sizing table in the line control word) are treated identically. The effect is that entire columns of the source image are thrown away to reduce the size horizontally. The memory available in the preferred embodiment is small, but if more memory were available, a larger block of memory could be used for sizing, such that any line could be sized arbitrarily and independently of any other line. Referring also to FIG. 12, a number of addressing cycles 1201-1207 are provided by the subsystem 130 to direct the storage and retrieval of data from the overlay RAM 182. The largest portion of the memory area of the overlay RAM 182 is used for the overlay bit map 1401. This bit map 1401 indicates whether each particular pixel of the destination plane is to be covered by an overlapping object (such as a window or cursor), or is to be available to display live video data. Lines of data are packed within this portion of the bit map to conserve memory requirements. Each line of video has several blocks of data in the overlay RAM 182 associated with it. There is a starting overlay index stored in the address range 1403, which is used to preload the overlay index counter 133 at the beginning of a line. This index will be used in later processing of the video line to determine where in address range 1401 to get overlay information for this line. There is a line control word stored in address range 1403 also, as described earlier. Finally there is a nubus base address for the beginning of each line stored in address range 1402. Because the nubus is 32 bits wide and the overlay RAM 182 is only 16 bits wide, two cycles of the overlay RAM 182 may be required to access the overlay RAM 182 as a nubus slave 1207. The least significant bit of nubus address 1207 is capable of being toggled to specify whether the first or second half of a nubus address is active.

Figure 11A:
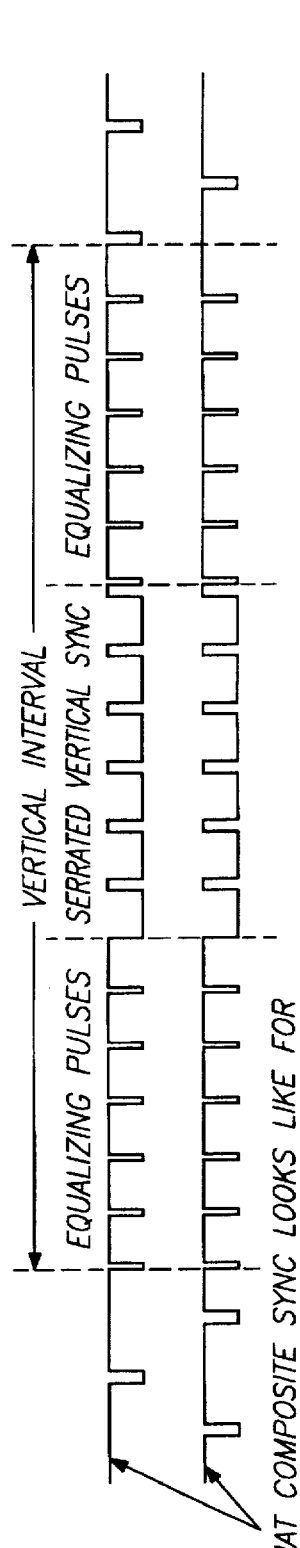
FIG. 11(a), 11(b) and 11(c) are timing diagrams showing video signals and data signals used in accordance with the present inventions.
Figure 11B:
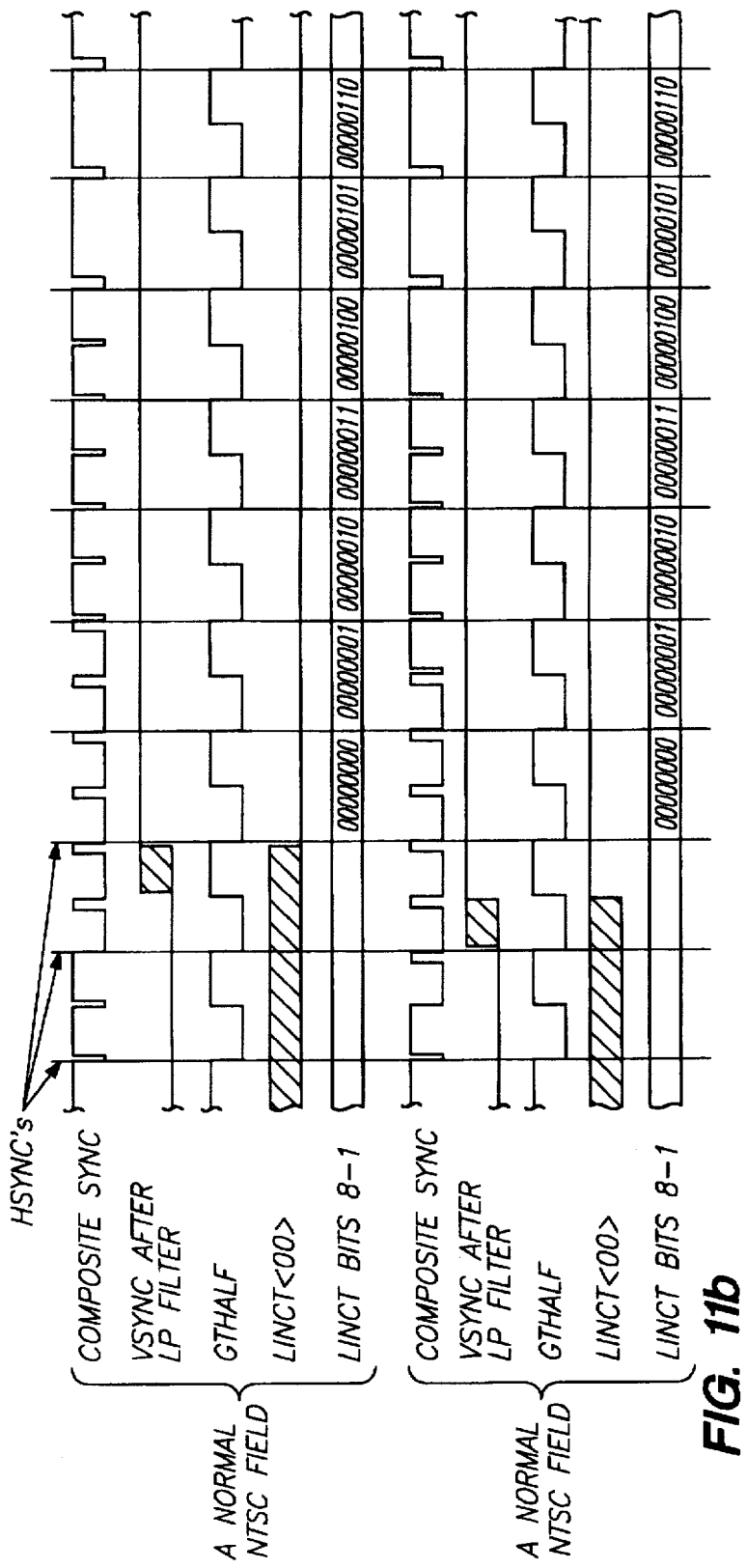
Figure 21:
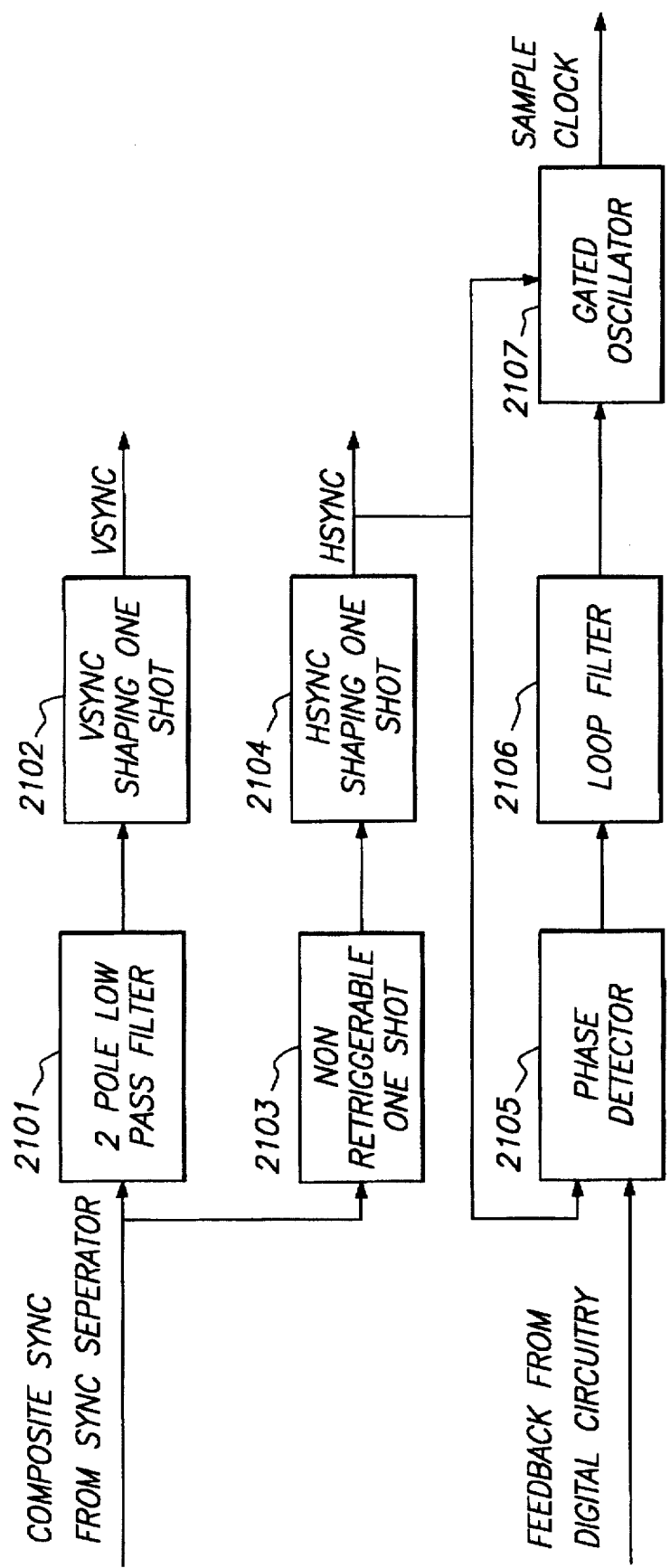
FIG. 21 is a block schematic diagram of a portion of the sync separator circuit according to the present invention.

The sync discrimination module 180 generates control signals for counters 131, 132 responsive to the horizontal and vertical synchronization pulses of the input video signal. The synch discrimination module 180 also provides a feedback signal to the clock generator 109. Furthermore, the sync discrimination module 180 signals the overlay RAM control module 181 when it is time to prepare for a new video line. The sync discriminator includes portions of the horizontal sync, vsync, line prep, and line run state machines, as illustrated in FIGS. 2b, 3, 4, 5 and 9. Traditional methods of sync discrimination, or "field detection", are capable only of interpreting video signals closely adhering to the RS-170-A video standard. Timing diagrams for the vertical interval of such standard video signals are illustrated in FIGS. 11(a) and 11(b). Few video signals that are received in common environments (such as broadcast video signals, cable video signals or video signals from video tape players) adhere strictly to the RS-170-A video standard. The sync discriminator of the present invention is relatively immune from common signal aberrations. FIG. 21 is a block diagram of a portion of the sync separator block 108. A composite sync signal for an interlaced video signal is illustrated in FIG. 11a. Before and after the vertical interval, composite sync consists only of horizontal sync. In the vertical interval, there are three horizontal line times of equalizing pulses, three lines of serrated vertical sync and three more lines of equalizing pulses. Equalizing and serrated pulses occur at twice the normal horizontal sync rate. Every other equalizing and serrated pulse is aligned with horizontal sync. The beginning of vertical sync is indicated by composite sync going from 'mostly high' in the equalizing pulse area, to 'mostly low' in the serrated vertical sync area. Because this high/low transition is a much lower frequency than horizontal sync, equalizing, or serrated pulses, a low pass filter is a standard way of separating vertical from composite sync. This is the function of block 2101 in FIG. 21. The components of the filter 2101 are chosen such that it takes longer than the first half-line of vertical sync, but not longer than the second half line of vertical sync, as described later herein. After that, vsync is passed through a shaping one shot monostable multivibrator 2102, before being passed to the digital circuitry. Note that vertical sync for the top half FIG. 11a is aligned with horizontal sync, whereas vertical sync in the bottom half of FIG. 11a is aligned with half way through a horizontal sync time. This causes every other vertical scan to be offset by one half of a horizontal scan line. This is how the video signal is interlaced.

Horizontal sync poses a different problem. During the vertical interval, sync pulses occur at twice horizontal rate. In order that these pulses not induce large errors in horizontal phase detection, a non-retriggerable one shot 2103 is employed. The time out of this one shot is chosen to be longer than a half line, but not as long as one horizontal sync time, so that it will not re-trigger for the non-horizontal sync-aligned equalizing or serrated pulses. When one shot 2103 does trigger, it in turn triggers the H sync shaping one-shot 2104. One-shot 2104 is set for a 100 nS pulse. This pulse goes to the phase detector 2105. This phase detector is of the 'sampled ramp' type. A constant current source is used to charge a capacitor, at the time when the feedback from the digital circuitry happens. The HSYNC pulse then samples the ramp at HSYNC time. If HSYNC is early, the ramp will be sampled earlier, and thus be a lower level, causing the oscillator 2107 to go faster. Likewise, if HYSNC is late, a higher than normal portion of the ramp will be sampled, which will cause the oscillator 2107 to go slower. The important feature of such a phase detector is that when the loop is locked to the correct frequency, the phase detector is a DC level. Many types of phase detectors have a large singularity at the phase compare time that must be filtered out. The loop filter 2106 is a standard servo loop filter. It is set for a response time of several seconds (very slow). The HSYNC pulse also gates the oscillator 2107. This oscillator is a gated voltage control oscillator. A capacitor is alternately charged and discharged from a current source whose current is proportional to the control voltage (from the loop filter 2106). When the control voltage is higher, a higher current is produced, the capacitor charges and discharges faster, and hence the oscillations are faster. The gate is used to hold the capacitor in the discharged state. Thus, when the gating clamp is removed, the voltage in the capacitor ramps up and starts the oscillator running. For any particular control voltage from the loop filter 2106, the charge up time, causing the first clock of that line, will take a particular time, that will be the same line-to-line. In this way the edges of the oscillations are synchronized on a sub-pixel basis to horizontal sync. The synch discrimination circuitry of the preferred embodiment therefore provides reliable processing of imperfect video signals.

Continuing to refer to FIG. 1d, the overlay data block subsystem 140 comprises five main modules. The horizontal size shift register module 141 is a parallel to serial shift register that is loaded with 16 bits of sizing information from the overlay RAM module 182 every time 16 bits of source video information is processed. The value of this data determines whether or not the current source pixel is to be selected for display in the destination plane. The overlay register module 144 is also a parallel to serial shift register. This module 144 is shifted once per destination pixel. Because both the horizontal size shift register 141 and the overlay register 144 could need to be loaded with a new 16-bit word during the same pixel time, the parallel overlay register 142 is used to double buffer the overlay information. The shift register 144 loads data from the parallel-to-parallel overlay register 142 so that the overlay register 142 may be loaded with the next 16 bits of overlay information from the overlay RAM 182 within the next 16 clock pulses. Overlay data read cycles and horizontal size read cycles occur every 16 clock cycles, so the use of register 142 ensures that overlay data and horizontal sizing data do not interfere with each other.

The block counter 143 reads the low-order bits of destination address information from the overlay RAM module 182. The block counter 143 is incremented responsive to the horizontal size shift register 141 (path not shown). Data from the block counter 143 is combined with data from the overlay shift register 144 in the block information register 145. The block information register creates a three-bit block information word. The bits of this word are the signals SVIS (some visible), SINV (some invisible) and LINST (line start). SVIS and SINV indicate whether any of the pixels in the block are to be visible or invisible, respectively. LINST indicates whether this is the first block in a line. This data gets passed to the Block Info FIFO 178 to be used by the bus arbitration and control logic module 179 in determining whether to request a bus cycle (if SVIS is set), whether to perform a block read before a block write (if in 8 bit per pixel mode and both SVIS and SINV are set) and whether destination address counter 154 and Destination address slot register 153 are to be loaded with the data in High and Low address registers 151, 152 (when LINST is set). Many other functions could use the block control word (for example, a bit depth for this block, or a block size of this block). If SVIS is not set, then no pixels in this block are visible, so the output side simply reads the data out of the data FIFO (First-In, First-Out memory) and ignores it (called a null cycle). If both SVIS and SINV are valid, there are both visible and invisible pixels in this block. If it is 8 bit mode, the output side must then perform a read modify write cycle on the block. If SINV is not set then all the pixels in the block are visible and the block is simply written. This information also serves as the asynchronous communication of control information between the two halves of the board. When the output half sees the output ready of the block information FIFO, it reads the block information word and analyzes the information. It will then initiate a bus arbitration if necessary, as later described herein.

The destination address information from the overlay RAM module 182 is also sent to the destination address generation subsystem 150. This subsystem 150 comprises four major modules. The high and low destination address register modules 151 and 152 load the destination address information from the overlay RAM module 182. The output of these registers 151, 152 is loaded in a destination address counter module 154, which consists of a 24 bit binary preloadable counter. The output of the high destination address register 151 is also loaded into a destination slot address register module 153. In accordance with the specifications of nubus, the slot address register 153 contains the highest eight bits of the destination address, and the remaining 24 bits of the destination address serve as counter information in module 154. This is permitted because nubus architecture is limited at 24 bit address space, per board, where the remaining 8 bits select the particular board. In nubus, the top 8 bits of address select which board slot is being addressed, the remaining 24 bits of address are available for the board to use in whatever manner makes sense. The destination image cannot span addresses such that the top 8 bits change, therefore only 24 bits of counter are required to build the destination address.

The driver software of the preferred embodiment initializes the overlay RAM 182. To do so it writes data over nubus to a predetermined address where the overlay RAM 182 is decoded as a nubus slave device. The address to the overlay RAM 182 comes from the nubus address latch 134 through the address multiplexer 135 as discussed earlier. The data for a write to overlay RAM 182 is latched, 32 bits wide in the overlay write data latch 171, and this sequentially places 16 bits at a time on the overlay data bus by the hi-low multiplexer 172, as discussed earlier. For reads of overlay RAM 182, the address again comes from the nubus address latch 134. Two 16 bit words of data being read are latched in the overlay read latches 176. These are combined to form a 32 bit word, and placed onto the internal bus by the buffers 177. From here they are placed on nubus by nubus bus buffers (not shown) to complete the read cycle.

The driver software also controls the microcontroller 174. Data coming to the microcontroller 174 from the nubus is latched and multiplexed by modules 171 and 172, then latched again by the data to micro latches module 173. This second latch module 173 is required because the microcontroller 174 is extremely slow. Similarly, data from the microcontroller is latched in the data from I2C micro latches module 175 before being latched and buffered by modules 176 and 177 and eventually transmitted over the nubus. The microcontroller 174 has two 8 bit and one 2 bit ports. The microcontroller is internally programmed to use one of the 8 bit ports for control over the selection of data to be latched or read, and the other 8 bit port to control read and write data. The 2 bit port uses dedicated hardware to implement the Signetics I2C communication protocol standard. This protocol uses a two wire serial bus for control of the external analog box subsystem 100, many of the components of which include corresponding ports for communication using this protocol. Such parameters as volume, balance, treble, bass, hue, color, brightness and contrast are adjusted by the microcontroller 174.

Referring now to FIG. 2(a), a sample state diagram is illustrated for purposes of explanation. The circuit design of the preferred embodiment employs programmable gate arrays manufactured by XILINX, Inc. The primary programmable element of such gate arrays is a configurable logic block (CLB). Each CLB has two available functions of four input pins. The functions may be combined to form a single function of five variables. The functions are implemented by programming look up tables of the CLB, and may be arbitrarily complex as long as they do not require greater than five input variables. The function outputs may be connected directly to other logic circuitry such as two D-type flip flops. The output of these flip-flops, in turn, may be supplied as inputs to the function or may be connected directly to other CLB's. Each CLB also has an asynchronous reset option available. In addition, an overall reset pin on the entire array resets all flip-flops in the array to a O state. In the preferred embodiment, the logic is implemented by a state machine design having one state per bit. Under such an implementation, hardware may be designed directly from state diagrams. A given state of a circuit is illustrated as a rectangle 201. The signals active within that state are provided as text 202 within the rectangle 201. The name of the state is denoted by a letter 203. A conditional branch is illustrated as a diamond shape 204, with the decision rule described in text 209 and the resulting paths shown described by possible test results 205 and 206. Conditionally active signals within a state are illustrated with a rounded rectangle 207, the conditionally active signals are described in text 208, and the conditions are shown as decision diamonds above. Thus, for FIG. 2a, the signal 208 in box 207 is asserted when the machine is IN STATE A and the result of 'Some Decision' is '1'. State sequence flow may or may not use the same decision boxes. As an example, look at the flow arrows above state E in FIG. 4. When the machine is in state C and LINCT<00> is a 1, or if the machine is in state D and LINCT<00> is a 0, set VSERR is asserted. However, both state C and state D, regardless of the state of LINCT<00> or whether or not set VSERR is asserted, will end up in state E. This is shown by all the paths originating from states C and D end up in state E before any other states.

Referring now to FIG. 2b, as an example of how hardware design can directly flow from state definitions, the first few states of the Hsync state machine illustrated in FIG. 2 are:

STATE_A_I:/((STATE_I*EQ2K*BDSR)) RD=HRST CLK=SAMPCK

STATES_B:=/STATE_A_I RD=HRST CLK=SAMPCK

STATE_C:=(RUN*STATE_B) RD=HRST CLK=SAMPCK

STATE_D:=((/EQO*STATE_D)+STATE_C) RD=HRST CLK=SAMPCK

STATE_E:=((/EQ640*STATE_E)+(EQO*STATE_D)) RD=HRST CLK=SAMPCK

STATE_F:=(EQ640*STATE_E) RD=HRST CLK=SAMPCK

VBL:=STATE_B+VBL*/STATE_J where :=means registered signal; RD means reset direct, * means 'and'; +means 'or'; / means 'not'. State A is an active low signal (STATE_A_I means 'state A inverted') whereas all the other states are active high- This is so that a reset, which sets all flip-flops to zero, will leave the state machine in state A. The equations are formed by following all the decision paths that lead to that state. The gate array allows programing in this manner where the equation is the next state equation for it's flip-flop. If a state depends on too many variables, multiple level combinatorial logic is implemented. For instance, a function of six variables such as:

STATE_X:=STATE_B+STATE_C+STATE_D+STATE_E+STATE_F+STATE_G would be split into two functions, one of which is not registered:

PRE_ST_X=STATE_B+STATE_C

STATE_X:=PRE_ST_X+STATE_D+STATE_E+STATE_F+STATE_G

The corresponding state diagram for the steps of the horizontal synchronization state machine is shown in FIG. 2b. Similar transformation from state equations to state diagrams was performed for all of the logic implemented in XILINX arrays in the preferred embodiment.

The horizontal synchronization state machine serves to keep the pixel counter 131 synchronized with the "HSYNC" signal from the sync separator 108. State A is achieved by an asynchronous reset signal HRST. In state A a flip flop "GT" (greater than) is set. GT is the feedback signal to the clock generator 109. Normally GT is set in state H before HSYNC is asserted, but if HSYNC is asserted before GT gets set, GT will get set in state A. Three signals are generated in state B. The signal "LINCNTEN" (line count enable) is the count enable for the line counter 132, and will cause the line counter 132 to increment to the next line. The signal "PIXCNTLD" (pixel counter load) is the preload signal of the pixel counter 131. The pixel counter is preloaded with a negative 111 decimal, such that count 0 marks the start of an active video line. In this way, PIXCNT is the active pixel, starting from 0, within the active line time. ENAENDPD is a signal that terminates and pads the last data block with filler data. This normally occurs in state F, but if HSYNC is asserted before state F then ENAENDPD will be asserted here. Next, the value of the signal "RUN" is sampled. If the board is not running RUN is equal to 0 and the machine will wait in state J until the count of 0 has occurred. At that point it will drop down to state G skipping the states corresponding to active lines. If the board is running RUN is equal to 1 and the machine moves to state C. The signal "ENALIN-PREP" (enable line preparation) will start the line preparation state machine shown in FIG. 5. The state machine of FIG. 2b remains in state D until PIXCNT equals 0 which is a decode of count =0. At this point, the machine moves to state E and GT is cleared. The signal ENALINRUN (enable line run) starts the line run state machine of FIG. 9. The ENALINRUN signal will continue to enable the line run state machine until PIXCNT reaches 640. Then execution moves to state F and the ENAENDPD signal pads the end of that line. In state G, GT is cleared and will wait in state G until PIXCNT reaches a count of 780.. At that point, execution moves to state H and GT is set. The machine moves to state I and remains there until the next HRST, unless the "BDSR" (bad sync run) mode is called for. In that case it will wait for a pixel count of 2048 and then returns to state A.

Figure 3:
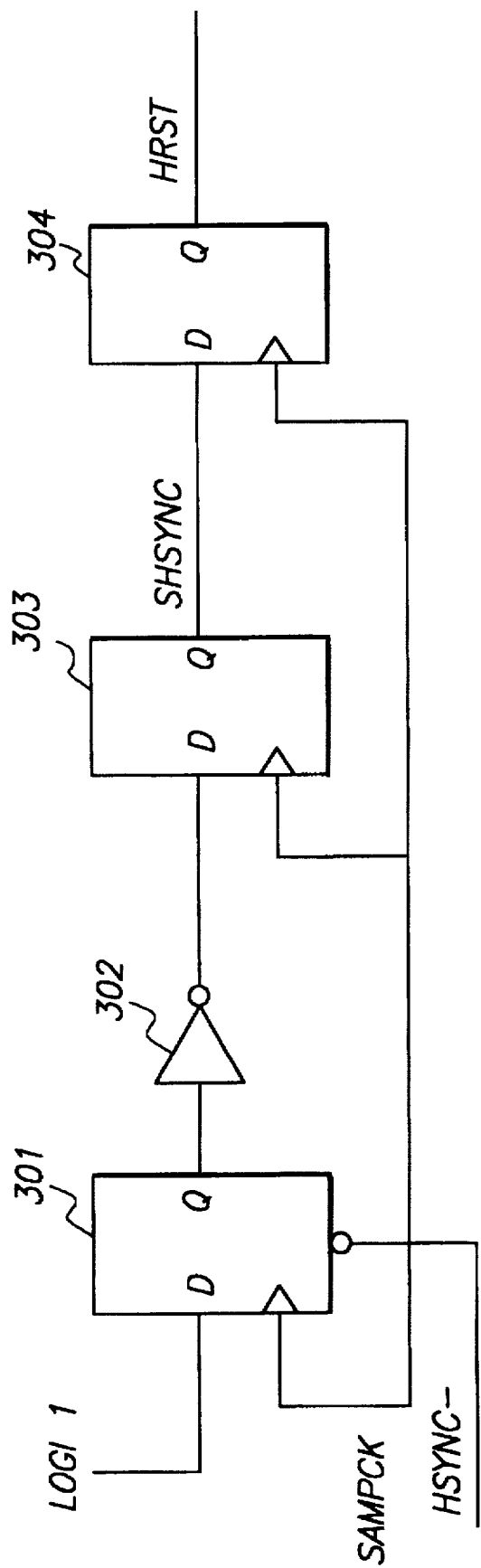
FIG. 3 is a logic diagram illustrating the generation of the "HRST" signal.

Referring now to FIG. 3, the signal HRST is created using three flip flops 301, 303, 304 clocked with the "SAMPCK" signal, at the sample clock rate. The signal HSYNC from the sync separator 108 asynchronously clears flip-flop 301. When flip-flop 301 is reset, its output will be 0, and therefore after inverter 302, the D input of flip-flop 303 will be a 1. On the next SAMPCK, flip-flop 303 will clock in a 1 which will appear on its Q output and therefore on the D input of flip-flop 304. On the next SAMPCK a 1 will appear on the Q output of flip-flop 304, thus asserting HRST which will reset the HSYNC state machine of FIG. 2b. Since the D input of flip-flop 301 is held to a logic 1 level, the first clock after HSYNC goes away, it will clock in a 1. The next clock flip-flop 303 will clock in a 0. The next clock flip-flop 304 will clock in a 0, thus de-asserting HRST and allowing the HSYNC state machine of FIG. 2b to run. The output of flip-flop 301 is essentially asynchronous in that the Q goes from a 1 to a 0 asynchronously. However, going from a 0 to a 1 may (indeed often will) violate the set-up before clock requirements. In this case, the output may go meta-stable, requiring some time to settle to a 1 or 0 state. The same is true of flip-flop 303. Its D input setup requirements will often be violated so its Q output may go meta-stable. However, the clock frequency is slow enough, that such meta-stability will almost certainly have stabilized into either a 1 or a 0 before flip-flop 304 is clocked. Thus, the HRST signal can be treated as asynchronous with respect to SAMPCK. One final possible problem is the possibility of unfortunate meta-stable behavior that could cause an HSYNC to be missed entirely. But because HSYNC is asserted for 100 nS, flip-flop 303 is guaranteed to see a logical 1 for some large proportion of that 100 nS. The clock frequency is such that 100 nS should span at least one complete clock cycle, and therefore meet all setup and hold requirements of flip-flop 303. Since the data input of flip-flop 301 is held to a logical 1, when flip-flop 301 receives a clock pulse, the output of flip-flop 301 will go to a logical 1, thereby setting the input to flip-flop 303 to a logical 0 via inverter 302. As shown in FIG. 21, the HSYNC signal is of approximately 100 nS duration. Because of the relatively low clock frequency, the flip-flop 303 should have a stable signal of logical 1 for at least one entire clock period. Therefore, the HRST signal produced at the output of flip-flop 304 is fully synchronous with respect to SAMPCK.

Figure 4:
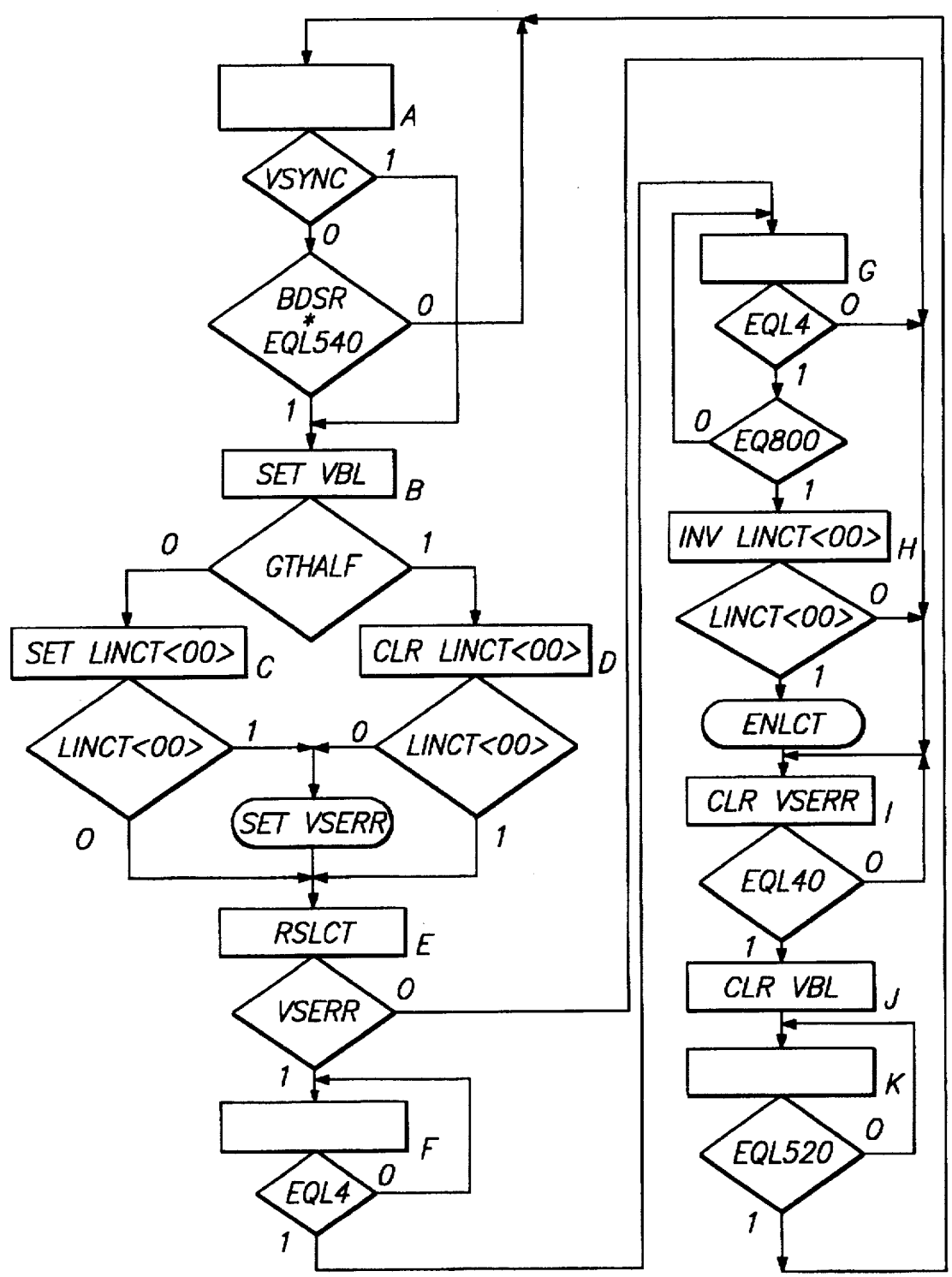
FIG. 4 is a state diagram of the "Vsync" state machine of the preferred embodiment.
Figure 11C:
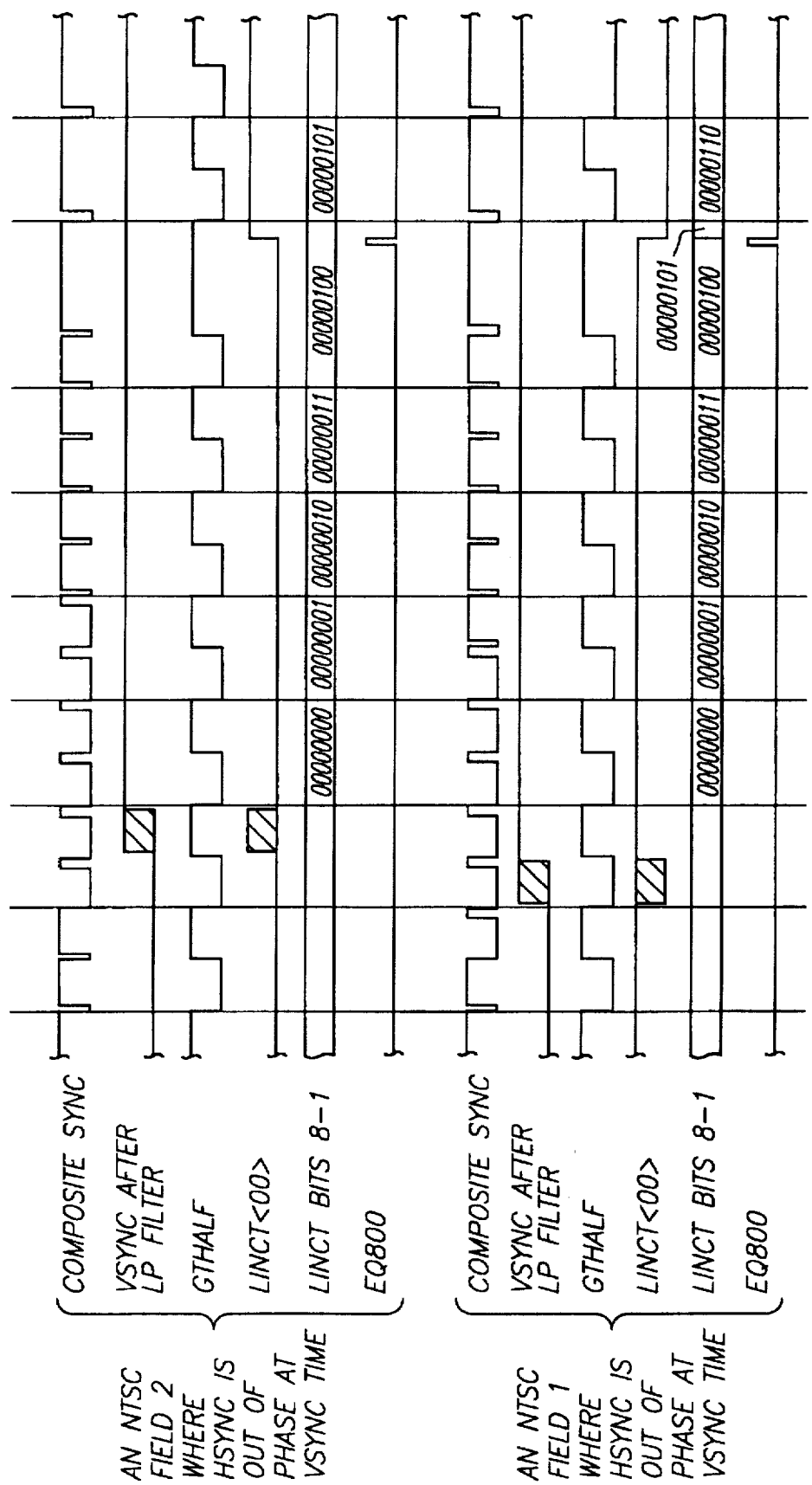

Referring now to FIG. 4, the VSYNC state machine keeps the line counter 132 in synchronization with the incoming video. The main task is to detect which interlaced field the current video is in. This corresponds to the least significant bit of a binary counter. Therefore, LINCT<00> (the least significant bit of the line counter 132) is generated by this state machine, and left untouched until the next VSYNC cycle. The effect is that the line counter counts by two lines each HSYNC cycle, and the linecount therefore remains either even or odd until the next VSYNC. Referring now to FIGS. 11(a) and 11(b), on a clean video source it is sufficient to simply detect what part of a horizontal line vertical sync comes active in. The standard way of doing this is to use a typical second order phase locked loop (PLL) to generate the HSYNC signal. This PLL generates a clock signal that is synchronized to the horizontal synchronization signal from a standard synchronization separator. The vertical equalizing and serrated pulses which are twice the horizontal sync rate have little effect on the horizontal rate because the second order PLL employed in the prior art cannot quickly adjust to the double frequency. An important advantage of this prior art scheme is that it has good noise immunity. If a noisy synchronization pulse is encountered, the PLL does not change frequency very much. The disadvantage of this scheme is that it cannot synchronize well to the output of a non time base correct video tape player. This is because the typical video signal of a tape player contains 'seams' where the player switches from one head to another. In video tape players the video playback heads typically are mounted on a rotating drum. The tape handling mechanism typically wraps the tape half way around the drum. The heads on the drum are arranged such that when one head leaves the tape, the other just contacts the tape. The electronics of the player switch from one head to the other. Even in the best tape mechanisms, one horizontal line becomes distorted in this process. This line can be anywhere from nearly twice too long to vanishingly small. To a second order PLL this change in line length appears as a step phase change, which can be quite large. Because the controlled parameter in a second order system is the rate of the clock, the clock must speed up or slow down to regain sync, and then normalize again to the original frequency. In order for this to happen before active video lines start, the PLL must have a quick transient response. Quick transient response, however, reduces the noise immunity and stability of the PLL. Most systems, consumer television receivers included, cut an acceptable medium between noise immunity and speed. In the preferred embodiment, a first order PLL as illustrated in FIG. 21 with a very slow response time is employed. This PLL consists of an oscillator 2107, gated to remove sub-clock skew and counters (PIXCT 131) that are preloaded at every horizontal synchronization pulse. At the next horizontal synchronization pulse feedback signal, GT, as described earlier, is sampled. If the clock frequency was too low or too high it is slightly adjusted. Because the counters are loaded each time, the step phase change merely changes the next line a small amount. A one shot monostable multivibrator 2103 is used to inhibit the phase detection on the equalizing and serrated pulses of the vertical interval. This is necessary to preserve the horizontal phase through the vertical interval. The vertical synchronization signal is separated in the standard way, by passing the composite sync signal from the synchronization separator 108 through a low pass filter. The portion of the horizontal line in which the vertical synchronization signal comes active is then determinate of which interlaced field is active. The components of the VSYNC low pass filter were selected to make a delay of at least one half a line but never more than a whole line. At the time the "VSYNC" signal goes active, the "VSYNC" state machine of FIG. 4 chooses the field depending on whether VSYNC is the first or the second half of the horizontal line. One difficulty is that many higher performance videotape recorders position the "seam" between tape heads in the first part of the vertical interval, just before VSYNC is asserted. There is a problem with detecting in which portion of a horizontal line the vsync occurs. The one short 2103 is intended to inhibit the interpretation of the mid-line aligned equalizing and serrating pulses of the vertical interval. If a video tape player seam occurs in the first set of equalizing pulses, the one shot 2103 may either fail to lock out an equalizing pulse (if the time between two pulses is too long due to a seam), or it may lock out an HSYNC aligned pulse (if the time between two pulses is too short). In either case, the one shot 2103 and therefore HSYNC produced by one shot 2104 will then be triggering on the half-line aligned pulses, rather than the hsync aligned pulses for the duration of the vertical interval. FIG. 11b shows the interlaced vertical intervals of a normal NTSC field 1 (top) and an NTSC field 2 (bottom). In the top half, vsync (the second trace) goes active in the second half of the horizontal line (indicated by the state of the GTHALF signal). This indicates an NTSC field 1. Therefore (because lines are counted from zero in the preferred embodiment) LINCT<00> is set to zero (by the vsync state machine described in more detail later). At the first HSYNC after VSYNC the other bits of LINCT are cleared. Field 2 shown in the bottom of FIG. 11b is identical, except for the fact that VSYNC goes active in the first half of a horizontal line. This indicates an NTSC field two, and accordingly LINCT<00> is set to a 1. LINCT is reset as above. In FIG. 11c two more vertical intervals are shown. In this case it is assumed that due to a video tape player seam that occurred earlier (not shown) the one shots 2103 and 2104 are being triggered on the wrong equalizing and serrated pulses. Until the fourth line after vsync the top and bottom fields and associated signals are identical to the top and bottom intervals shown in FIG. 11b. However, due to the error induced by a tape seam, the NTSC field 2 (top of FIG. 11c) appears to be an NTSC field 1 (same as the top of FIG. 11b). Similarly, due to the seam induced errors, an NTSC field 1 (bottom of FIG. 11c) appears to be an NTSC field 2 (same as the bottom of FIG. 11b). However, the fourth line after vsync contains no equalizing pulse, and therefore HSYNC will take an extra half line time. The pixel counter 131 will therefore count up higher than is normal. This higher than normal count, in the fourth line after vsync alerts the VSYNC state machine of FIG. 4 (described in detail later) that the detected field is in error. Therefore LINCT<00> is toggled to the correct level. In addition, in the case of NTSC field 1, the error caused VSYNC to be delayed to the next horizontal line, therefore the linecount is behind by one, and must be incremented. After line 4, both fields are correct, and the same as the normal fields of FIG. 11b. In the current design, the interrogation of the 4th line is only done if the new field has not switched from the previous field.

More specifically, referring now to FIG. 4, the VSYNC state machine originates in state A following the assertion of a reset signal. The machine remains in state A until either a VSYNC or a line count of 540 in BDSR (bad sync run) mode is encountered. At that point the VBL (vertical blanking) flip-flop is set in state B. Then the signal GTHALF (greater than half-corresponding to the first or second half of HSYNC time) is tested. As a result of this test the machine will go either to state C or state D and set or clear LINCT<00>, bit corresponding to the current field. If the field bit remains unchanged, the VSERR (VSYNC error) flip-flop is set. In state E the signal "RSLCT" (reset line count) resets the line counter 132. Then, if signal VSERR is not asserted, the field is simply accepted, and the state machine will move to state I. If VSERR is asserted, the vertical interval is further processed. The machine remains in state F for four lines following VSYNC. Refer also to FIG. 11C. At line 4 after VSYNC, the machine remains in state G until either line=4 goes false or pixcount=800 (several clocks longer than a normal line), whichever comes first. If the EQL4 signal (equal to line 4) becomes false first, the 4th line is not too long, therefore horizontal phase was correct in the vertical interval, so the field detection must have been correct, and the state machine moves on. If the signal "EQ800" (pixcount equal to 800) comes true within line 4, horizontal phase must have been wrong in the vertical interval, and therefore the field detection must be wrong. Therefore in state H LINCT<00>is inverted. Finally if the detected field was a '1' then the horizontal phase error must have made VSYNC appear one line later than it should have, so ENLCT increments the line counter 132. The machine moves to state I, clears the "VSERR" signal, and remains in state I until EQL40 (equal to line 40) becomes true. Line 40 (actually video line 20 because the line counter counts by twos) is the first active video line, so in state J VBL (vertical blanking) is cleared. The machine then moves to state K and remains there until EQL520 (equal to line 520) becomes true. The machine then returns to state A and waits for a VSYNC signal again.

Figure 5:
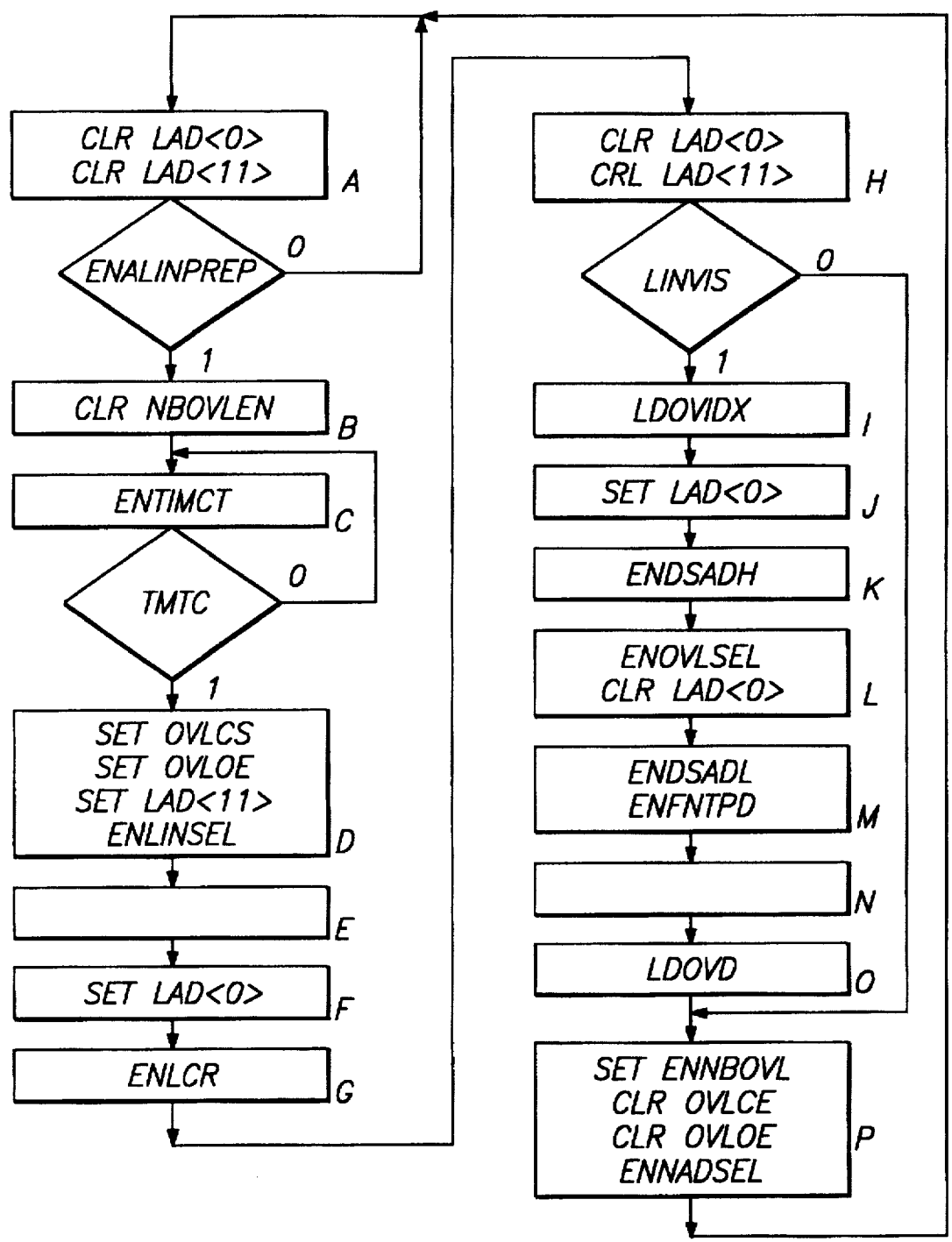
FIG. 5 is a state diagram of the "Line Prep" state machine of the preferred embodiment..

Referring now to FIG. 5, the line prep state machine performs the necessary operations to get a line ready for transaction blocks. This state machine is not included as part of the HSYNC state machine because the line prep state machine is not reset by the HRST signal. The reason for this is so that once transmission of a line is started, it must be cleanly finished. Initially (e.g., on power-up reset), this state machine is put in state A. Here it clears LAD<0> and LAD<11> (line addresses 0 and 11. These are the overlay address lines 0 and 11 when the overlay address mux 135 is set to use the line counter 132 as the address source. Refer to FIG. 12, lines 1202, 1203, 1204, and 1205. The machine remains in state A until ENALINPREP (enable line preparation) goes active from the horizontal sync state machine illustrated in FIG. 2b. In state B the line prep state machine of FIG. 5 clears NBOVLEN (nubus overlay enable). This prohibits bus cycles from accessing the overlay RAM 182 while the video logic of other state machines is reading the RAM 182. In state C, a 6 state counter using ENTIMCT (enable timeout count) is enabled and the machine remains in state C until TMTC (timeout terminal count, which is 6 clocks after ENTIMCT) becomes true. State C ensures that any bus cycles into overlay RAM that could have started before NBOVLEN is cleared are completed. In state D the signals "OVLCS" (overlay chip select), "OVLOE" (overlay output enable), "LAD<11>" (see above), and "ENLINSEL" (enable line which selects linecount 132 as the address source) are set. The multiplexer 135 is now set, as per line 1203, ready to read a line control word. Because the overlay RAM 182 is relatively slow, two clock cycles are required to read the overlay RAM 182. Since the entire overlay address bus is processed through a flip-flop register, flip-flop changes in address don't take effect until one clock cycle later. State E waits for the address and chip control signals set in state D to take effect. In state F LAD<0> is set to prepare for an overlay index read (now multiplexer 135 is set to 1202). In state G, the line control read should be complete, so the "ENLCR" signal (enable line control register) goes active. In state H LAD<0> and LAD<11> are cleared to prepare to read the high portion of the destination base address for this line (multiplexer 135 is set to 1204). At this time, the line control register is valid, so if the vertical sizing bit of "LINVIS" (bit nine) is false, the line should be ignored. In that case the state machine moves to state F and the line is processed no further. If LINVIS is true (the line is visible), it is further processed. In state I the overlay index read cycle should be complete so the "LDOVIDX" signal (load overlay index, the preload for the overlay index counter) goes active. In state J LAD<0> is set, to prepare to read the low half of the destination base address of this line (multiplexer 135 is set to 1205). By state K the high destination address read should be complete so the "ENDSADH" signal (enable destination address high half) goes active. In state L the "ENOVSEL" signal (enable overlay select) is set, which switches the overlay RAM address multiplexer 135 so that the overlay index counter 133 is the address source. This is to prepare for reading the first 16 bits of overlay information for this line (multiplexer 135 is set to 1206). State L also clears LAD<0>. By state M the low destination address read should be complete so the "ENDSADL" signal (enable destination address low) is asserted. The "ENFNTPD" signal (enable front pad) is also asserted. ENFNTPD is a dual purpose signal. It loads the block counter 143 with the low order address bits. It also starts the block filler state machine of FIG. 6. State N of the line prep state machine delays to allow the first overlay data read to complete. By state 0 the first overlay data read has been completed, so the "LDOVD" signal (load overlay data) is asserted to loads the parallel overlay data register 142. State P clears OVLOE and OVLCS, sets ENNBOVL so bus cycles are again allowed, and sets the "ENNADSEL" signal (enable nubus address select) to switch the overlay RAM address multiplexer 135 to the latched nubus address. At this point, the board of the preferred embodiment is ready for active video portion of the line.

Figure 6:
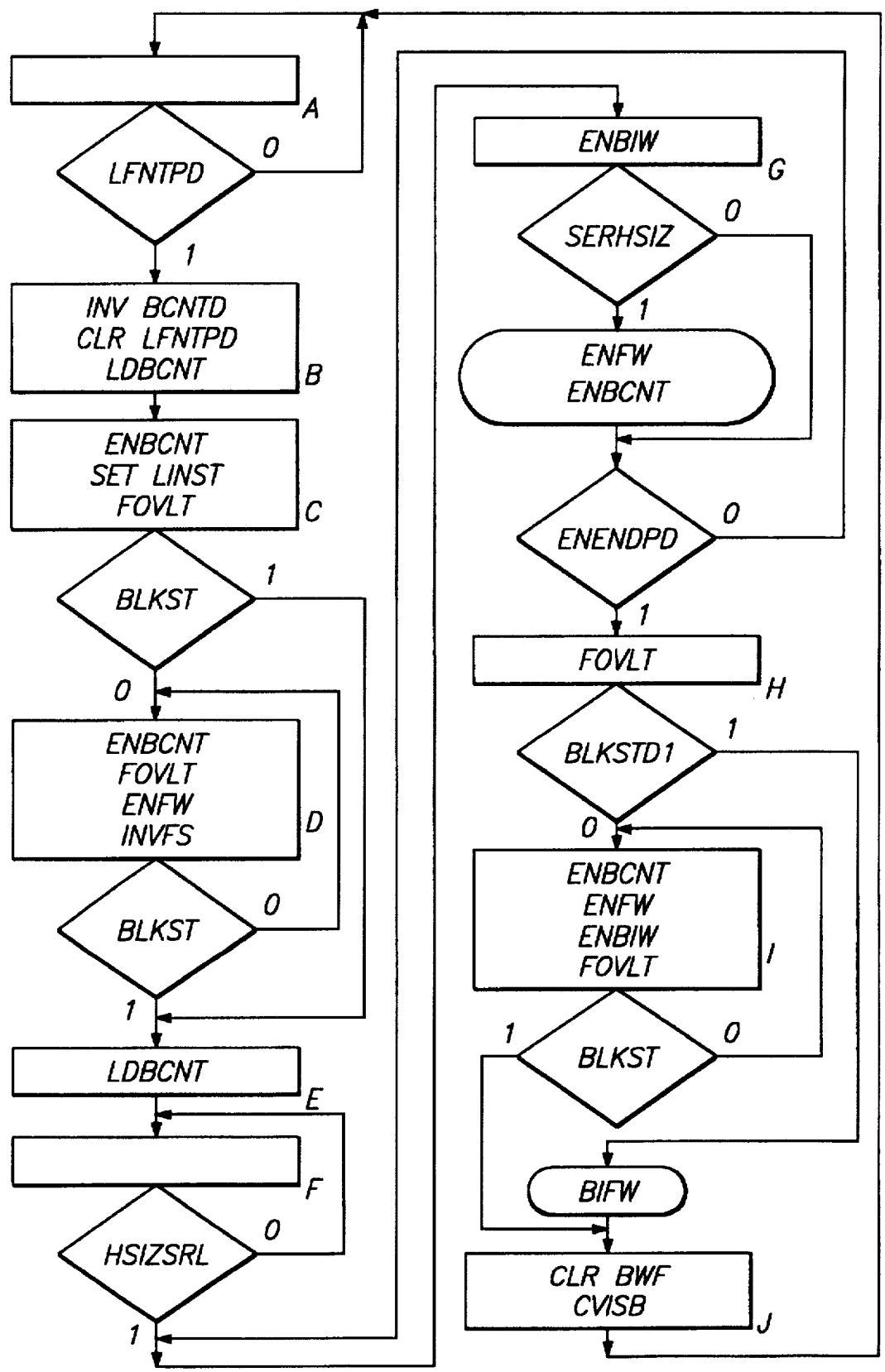
FIG. 6 is a state diagram of the "Block Filler" state machine of the preferred embodiment.

Referring now to FIG. 6, the Block filler state machine performs the front and end padding of blocks. This state machine also keeps track of one block's worth of data during active line time. It is also responsible for writing block information words into the block information FIFO 178. This state machine could have been part of the line prep state machine, but because of pinout constraints, is included in a different XILINX array in the preferred embodiment. For the frontpad function the block counter 143 is loaded with the inverse of the low order base address bits. The block counter 143 is then incremented until a terminal count (BLKST) is obtained. The value of BLKST is the correct number of pixels. An alternate way to do the same thing is to use an up/down counter, where the counter simply counts down to do the front pad. However, this requires significant logic in front of each flip-flop, and therefore does not fit into a XILINX array as well. The reset state of the state machine, state A, waits for the LFNTPD signal (latched front pad). This is just a flip-flop that is set by LNFNTPD from the line prep state machine of FIG. 5. When LFNTPD is asserted, execution goes to state B. Here LFNTPD is cleared, the data to be loaded into the block counter 143 is inverted by the assertion of the INVBCNTD (invert block count data) signal, and the block counter 143 is loaded by asserting LDBCNT (load block count). If the inverted load data is a block start (BLKST) then the beginning of the line must be block aligned, and the machine drops down to state E. If not it remains through state D until BLKST comes active. In state D ENBLKCNT (enable block count) is asserted, FOVLT (force overlay true) forces the pixels that are being written into the data FIFO 123 to be invisible, ENFW (enable FIFO write) is asserted, and INVFS (invert FIFO shift) switches the sense of the high and low data FIFOs, which are selected by the least significant bit of the block counter 143. Thus, the front of the line is padded with overlaid pixels. In state E the block counter 143 is again loaded with the low order base address bits, this time not inverted. The machine remains in state F until the first HSIZSRL (horizontal sizing shift register load) signal is asserted by the line run state machine of FIG. 7, signaling the beginning of the active video line. The machine next remains in state G while the middle of the line is processed, until ENENDPD (enable end pad) is asserted. While in state G, the ENBIW signal (enable block info write) is held asserted. The signals ENBIW and BLKST allow a block information word to be written into the block info FIFO. This will also reset the block information word for the next block. While in state G if SERHSIZ (serial horizontal sizing, the horizontal sizing bit associated with the current pixel from 141) is true, ENFW (enable FIFO write) and ENBCNT will be asserted, causing the data FIFOs to be written and the block counter to be incremented. This process repeats until ENENDPD becomes true. Then in state H, FOVLT is again asserted for the end of line pad. If BLKSTD1 (block start delayed one, the block start signal delayed by one destination pixel) is true, the line must have just filled a block. In this case BIFW (block info FIFO write) is asserted directly, and execution goes to state J. If BLKSTD1 is false, end padding is required so the machine returns to state I and stays in state I until BLKST goes active. While here it increments the block counter (ENBCNT), writes the data FIFO (ENBIW), continues to force overlay true (FOVLT) and enables the block info FIFO 178 to be written at BLKST time (ENBIW). In state J, the SVIS (some visible) and SINV (some invisible) bits of the block information word are cleared for the next line, and BWF (bandwidth fail, the logic to recover from a FIFO overflow) is cleared.

Figure 9:
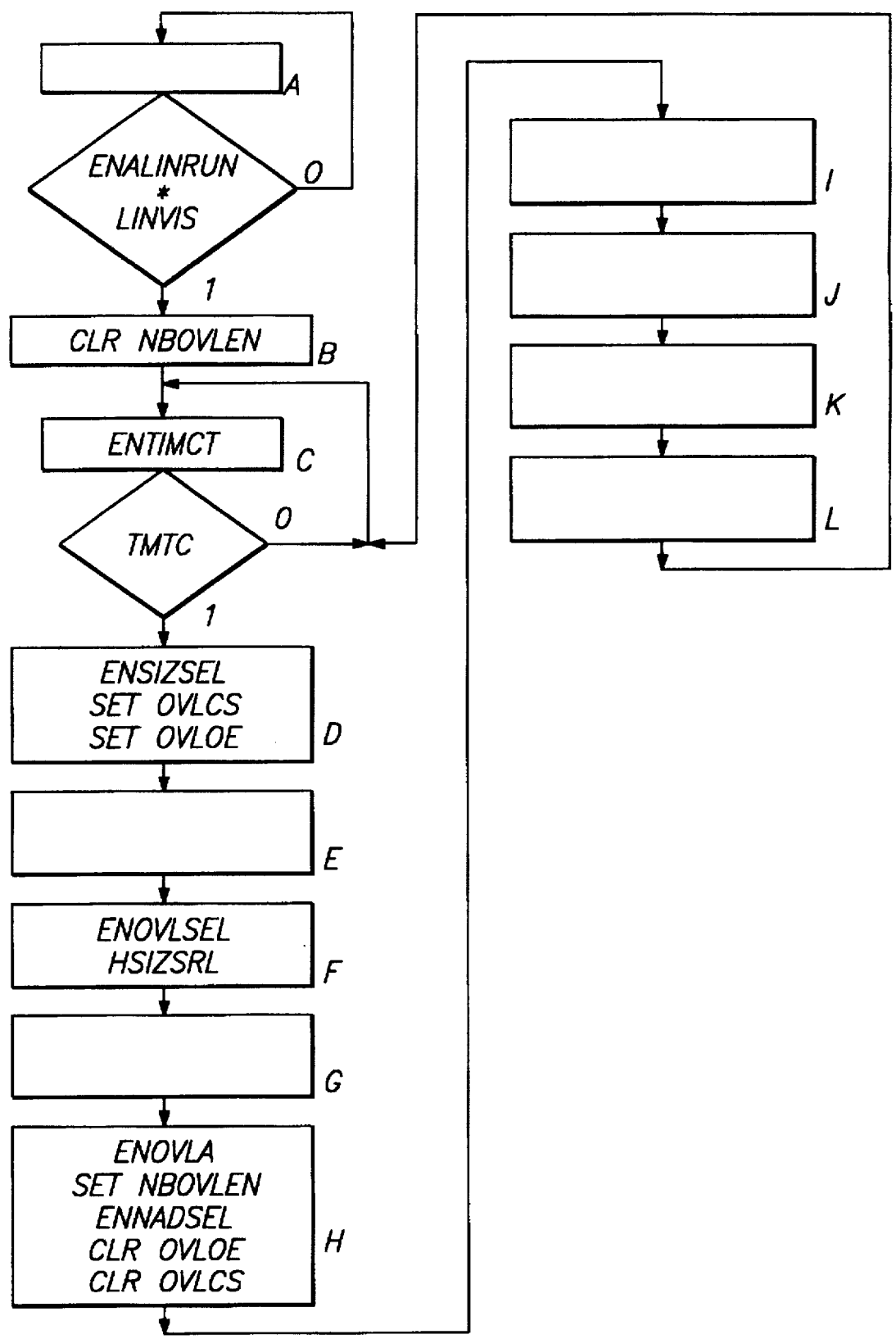
FIG. 9 is a state diagram of the "Line Run" state machine of the preferred embodiment.

Referring now to FIG. 9, in line run, the state machine preforms the overlay RAM read cycles required during active video. These are horizontal sizing data every 16 pixels, and overlay data as required. The reset state is state A. The machine remains in state A until the signals ENALINRUN from the HSYNC state machine of FIG. 26 and LINVIS (the vertical sizing bit) are asserted. In state B, the "NBOVLEN" signal is cleared to inhibit nubus access to the overlay RAM. State C enables the timeout counter, as described in connection with the line prep state machine of FIG. 5, and waits for the terminal count of this counter to be attained. This allows current cycles to be completed. In state D the "ENSIZSEL" (enable size select) signal switches the overlay RAM address multiplexer 135 to use the pixel counter 131 as the address source (1201), and OVLCS and OVLOE are set. State E waits for the cycle to be completed. In state F, the "ENOVLSEL" signal switches the address multiplexer 135 to the overlay index counter 133 as the source (1206), and asserts the "HSIZSRL" signal, which loads the horizontal size shift register 141. State G is waiting for the overlay data read cycle to be completed. In state H the "ENOVLA" (enable overlay A) signal causes loading of the parallel overlay data register 142 if the previous data was used in the previous 16 clocks. State H also sets up the overlay RAM 182 for the bus access again by setting the signals NBOVLEN, ENNADSEL, (mux 135 is set to state 1207) and clearing the state of OVLCS and OVLOE. The rest of this state machine (states I, J, K and L), simply use clock cycles to make the main loop of this state machine 16 clocks long.

Figure 7:
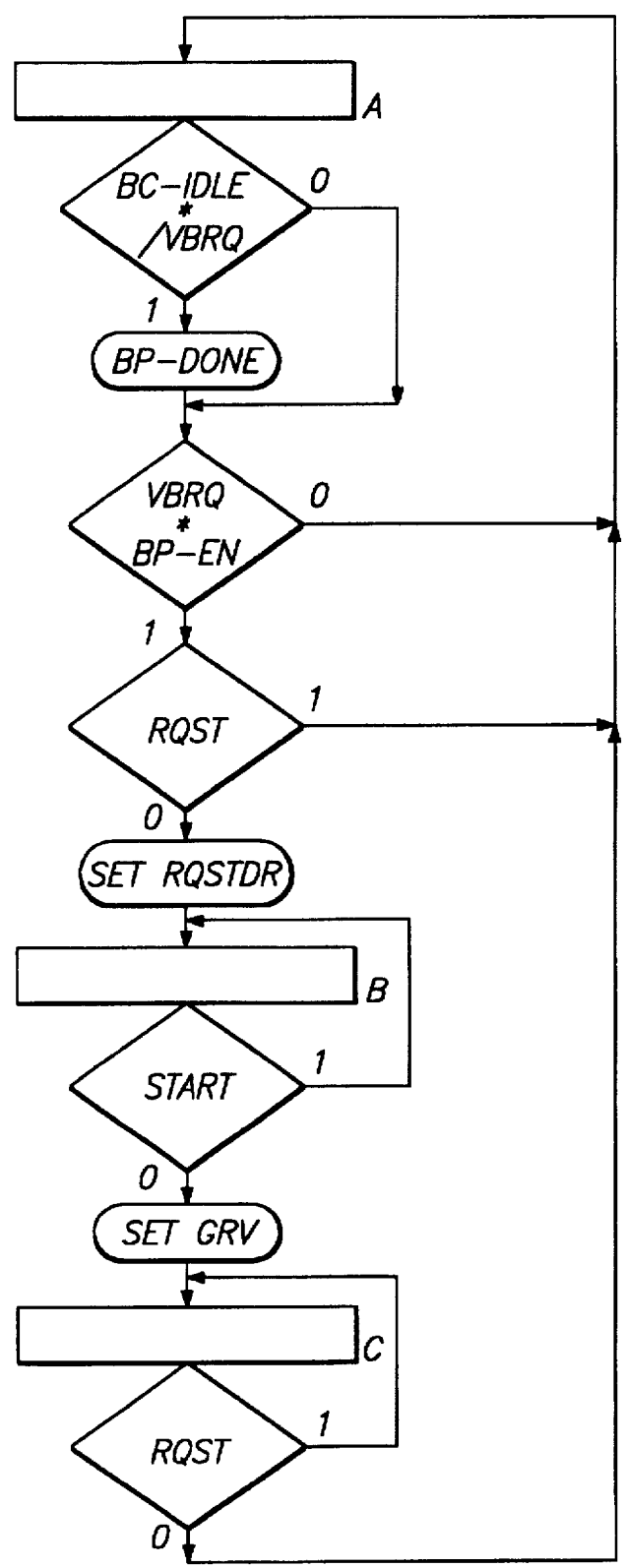
FIG. 7 is a state diagram of the "Bus Purge" state machine of the preferred embodiment.
Figure 8A:
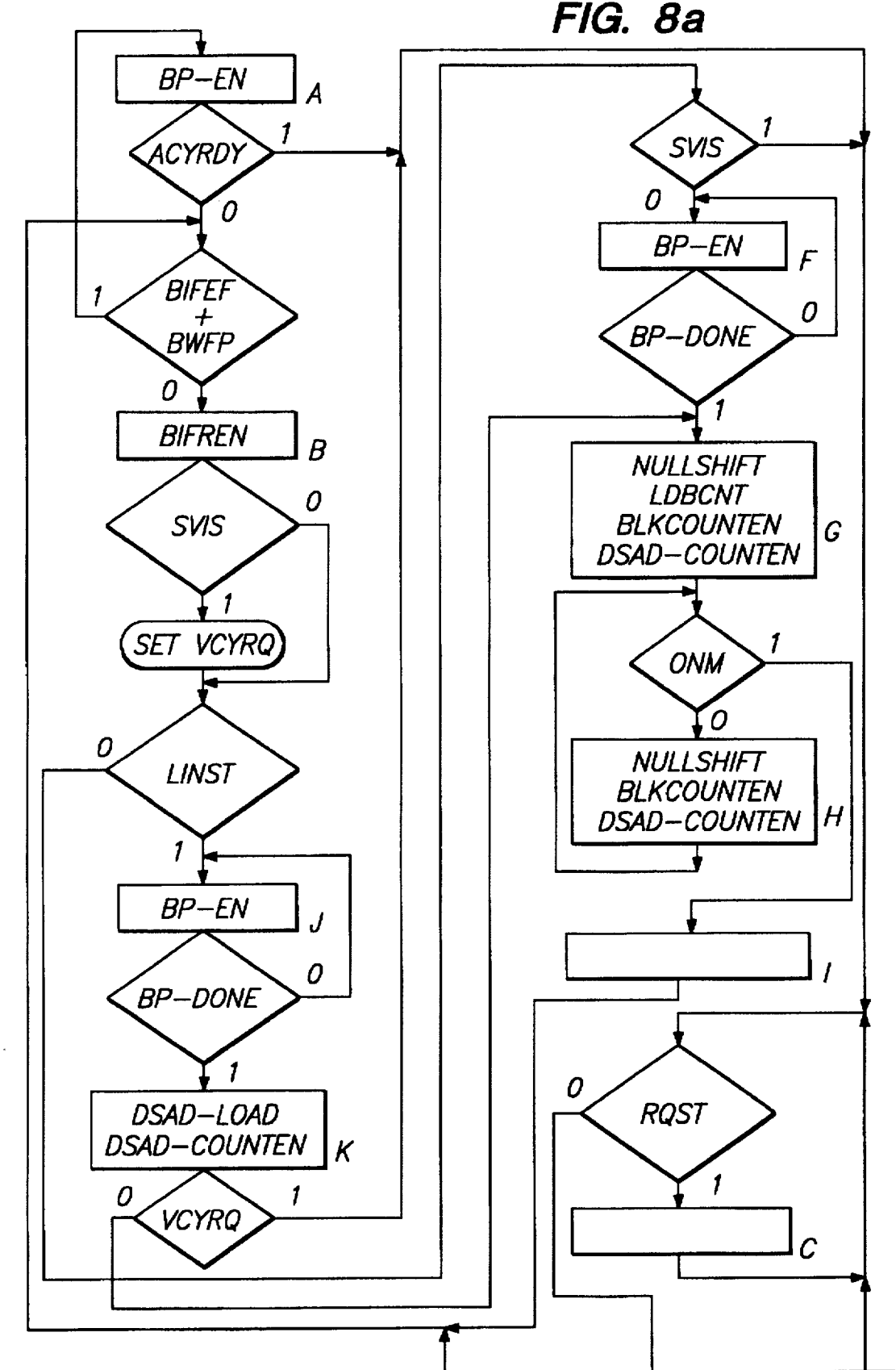
FIG. 8a provides a portion of a state diagram of the "Block Info Fifo Read" state machine of the preferred embodiment.
Figures 8, 8B:
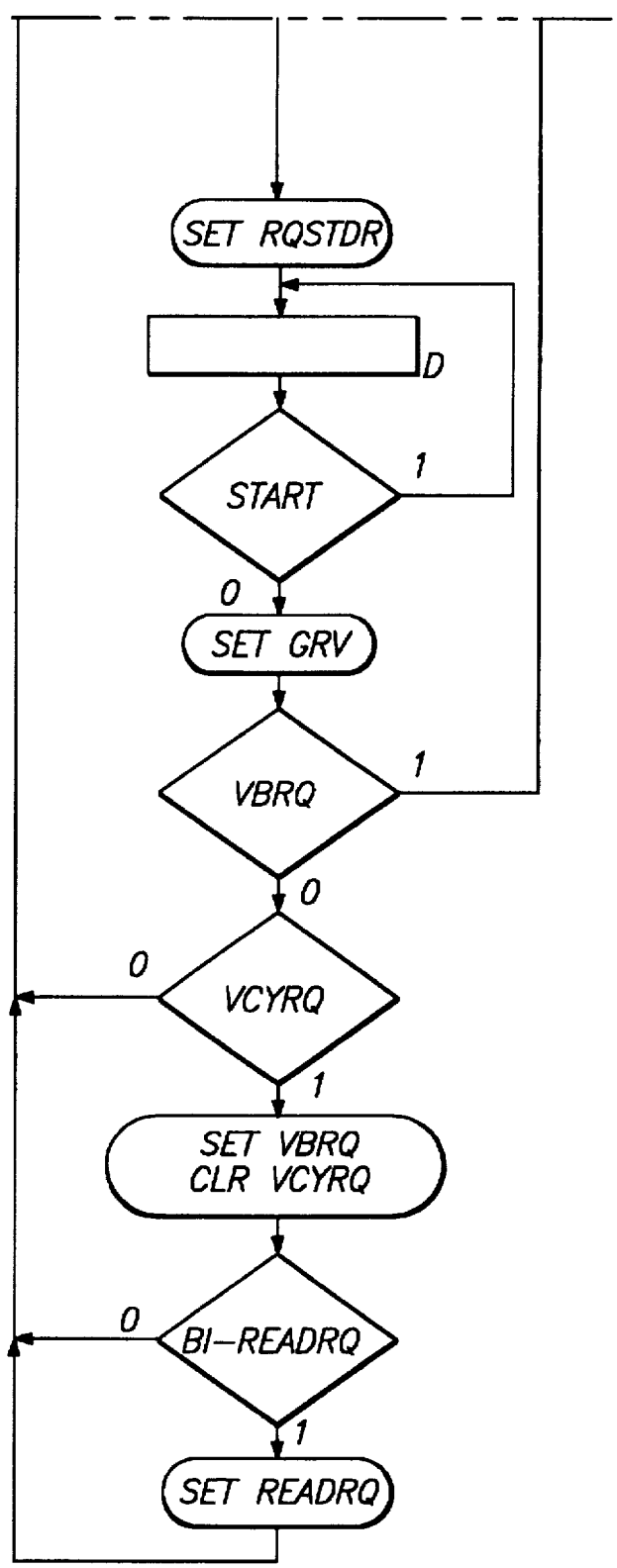
FIG. 8 illustrates the arrangement of FIGS. 8a and 8b, which together provide a state diagram of the "Block Info Fifo Read" state machine of the preferred embodiment.
FIG. 8b provides a portion of a state diagram of the "Block Info Fifo Read" state machine of the preferred embodiment.
Figure 10A:
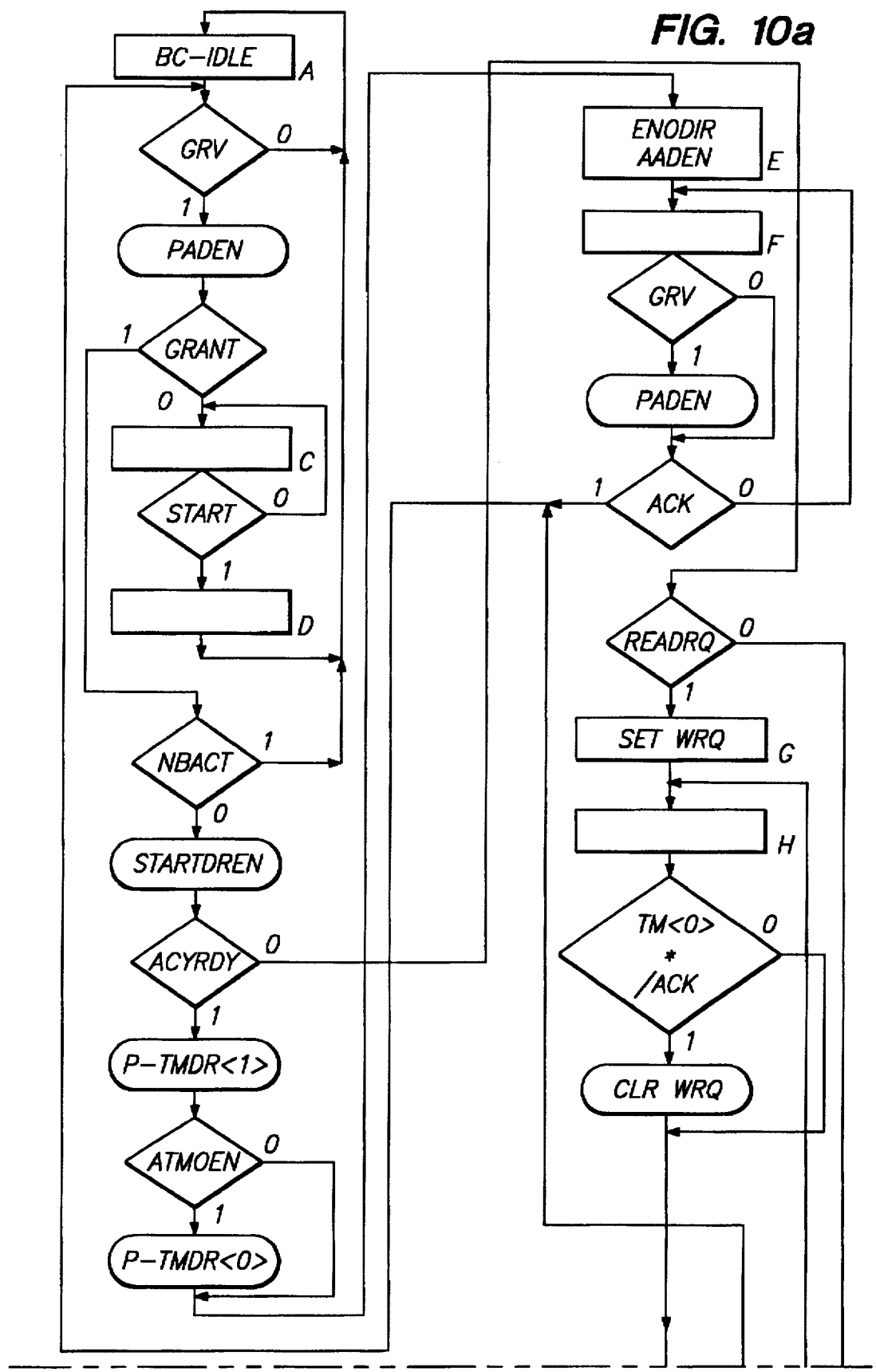
FIG. 10a provides a portion of a state diagram of the "Bus Control" state machine of the preferred embodiment.

Referring now to FIG. 8a and 8b, the Block Info FIFO Read state machine reads the block info FIFO and interprets the resulting data. It also performs all necessary bus arbitration. In general terms, this machine operates in a 'look ahead' mode so that a new bus arbitration may be started, if required, just after the previous one has been completed. This state machine loads the destination address counter 154 and performs null cycles which read out an invisible block without performing a nubus cycle. This machine calls the bus purge state machine of FIG. 7 to arbitrate for the bus and to start and verify completion of all bus cycles that the block info read state machine has 'looked ahead' for. This is necessary to determine whether the next reads from the data FIFO correspond to the block info word just read. This is necessary to ensure that the next reads from the data FIFO correspond to the current block info word. Referring now specifically to FIG. 8a, state A, the reset state, asserts BP-EN (bus purge enable) so that the bus purge state machine of FIG. 7 will arbitrate for any cycles which are pending but have not yet been completed. There are two ways of getting the state machine of FIG. 8a running. If ACYRDY (audio cycle ready) is active, a bus arbitration is necessary even if there are no video cycles pending. The other way is for the BIFEF (block info FIFO empty flag) and BWFP (bandwidth fail pending) are both inactive. The empty flag going false means that there is a block's worth of data in the data FIFO 123, therefore causing a block info word to be written into the block info FIFO 178 (as discussed earlier), and causing the block info FIFO 178 not to be empty. If there was a bandwidth fail (an overflow of one of the FIFOs) however, no new video bus cycles are arbitrated for. In state B the BIFREN (block info FIFO read enable signal) is asserted, permitting the block info FIFO to be read. If SVIS is active, the VCYRQ (video cycle request) signal is set. VCYRQ is a flip-flop storage element used by this state machine and also the bus purge state machine of FIG. 7. VCYRQ will be cleared when the bus arbitration for this video cycle is achieved. Next the LINST (line start) bit is checked. If it is NOT a line start, the state machine continues. If it is a line start, execution moves into state J. In state J BP-EN (bus purge enable) is held active. The machine remains in state J until BP-DONE (bus purge done) goes true. At this point any look ahead cycles have been completed, so the machine can safely load the destination address counter 154 and the destination slot register 153 with the data from the high and low destination address registers 151 and 152 (which were loaded previously by the line prep state machine of FIG. 5) by asserting DSAD-LOAD (destination address load). Because of the construction of the counter 154, DSAD-COUNTEN (destination address count enable) must be asserted for the load to take place. If VCYRQ has not been set, the machine moves to State G to perform a null cycle. If VCYRQ was set, the state machine moves to the conditional before State C to initiate a bus arbitration. If the conditional checking LINST in state B above returns 0, execution moves to a conditional checking SVIS. If SVIS is true, the state machine moves to the conditional before State C to initiate a bus arbitration. If SVIS is false a null cycle must be performed and execution moves to state F. State F enables the bus purge state machine (BP-EN) and waits for the bus to be purged (BP-DONE). The machine then proceeds to state G, where the "NULLSHIFT" (read the data FIFO without putting the data on the bus) signal is asserted, with a counter in module 179 is loaded with LDBCNT and BLKCOUNTEN to count the 32 bit words of the bus cycles, and the destination address is incremented to count the data that is being read. Then the decode signal ONM (only one more) is sampled. This variables normally indicates whether there is only one more long word in the current block, but because in this case the first read happened while loading the counter this variable indicates the end of a block. If ONM is false, data continues to be read from the data FIFO 123, and the block and destination address counters are incremented, until ONM goes true. When the null cycle is complete, the state machine goes to state I. The delay caused by state I makes the next state equations for states A and B more simple and easier to work with in XILINX. The bus arbitration begins with the conditional above state C. Nubus will only allow arbitrating bus masters to assert the nubus request (RQST) in the clock period after the RQST line is not asserted. State C simply waits for RQST to become unasserted. Referring now also to FIG. 8b, after RQST soon as it goes invalid the RQSTDR (request drive) flip flop is set on the next clock edge. State D waits for the bus arbitration to be completed. In accordance with the bus specification, a START (nubus start, similar to an address strobe) cycle restarts bus arbitration. After one clock cycle of bus arbitration, GRV (grant valid) is set on the next clock-edge. At this point the two clock cycles required for a nubus arbitration are complete. The bus control state machine of FIG. 10a and 10b is also started by GRV. The bus control state machine of FIG. 10a and 10b also clears GRV, so this need not be done by the Block info FIFO read state machine of FIG. 8. If the VBRQ (video bus request) signal is set it means that there is already another video cycle pending, so the machine initiates another bus arbitration. If VBRQ is not set, the machine goes on to look at VCYRQ. If VCYRQ is false the machine goes up to the conditional before state B to wait for block information ready in the block info fifo 178. If VCYRQ is valid, it gets cleared and VBRQ gets set. VBRQ is cleared at the assertion of START for a video write cycle in the state machine of FIG. 10a and 10b. If BI-READRQ (block info read required, indicating that the most recent read of the block info FIFO 178 had both SVIS and SVIS set, therefore requiring a block read before the block write) is true, READRQ is set. This will cause the bus control state machine of FIG. 10, 10a and 10b to read the background block before writing the video block. Regardless, execution returns to the conditional before State B.

Referring now to FIG. 7, the bus purge state machine arbitrates for, and verifies completion of, any look-ahead video cycles. This function could also have been integrated into the block info FIFO read state machine of FIGS. 8, 8a and 8b but is implemented as a separate state machine in the preferred embodiment. Again state A is the reset state. If at this point the bus control state machine of FIG. 10a and 10b is idle and there is no VBRQ, the bus is already purged, so BP-DONE is asserted. Next a conditional checks whether the bus purge is enabled (BP-EN) and if bus purging is required (VBRQ which indicates that there is at least one look ahead cycle pending). If not, nothing is done and execution returns to state A. If so, the value of RQST is checked. If RQST is already asserted, the machine will return to state A to try again. If RQST is not asserted, a bus arbitration is initiated by setting RQSTDR. State B waits for the first clock of arbitration. A START cycle at this point will restart the wait. If START is not asserted to restart the arbitration, GRV is set. This will start the bus control state machine of FIG. 10a and 10b. The bus purge state machine will then wait in state C until RQST goes false. This will only happen after the bus control state machine of FIG. 10a and 10b has won bus control and asserted START to initiate a write cycle (audio or video). The machine then returns to state A. Because VBRQ is cleared by the assertion of START in a video write cycle, the state machine will not arbitrate for the bus again. Instead, the machine will stay in state A, and will therefore assert BP-DONE when BC-IDLE comes true.

Referring now to FIG. 10a and 10b, the bus control state machine actually performs the bus cycles. Referring specifically now to FIG. 10a, state A, the reset state, asserts BC-IDLE indicating that this state machine is standing by. The state machine is activated by GRV (grant valid) being asserted. If GRV is asserted, the "PADEN" (pre-address enable) signal is asserted. This signal tells the external programmable array logic that generates the output enable for the audio and video addresses that a bus cycle is about to begin. The GRANT signal is then checked to determine whether the bus has been granted to this board. If GRANT is false, a new bus arbitration must be initiated. State C waits for START to be asserted by whatever bus master is currently controlling the bus. The assertion of START initiates the new arbitration. State D is a wait state for the first clock of the new bus arbitration. Execution then goes to state A which will be the second cycle of the new bus arbitration. If GRANT is true NBACT is checked to see whether the bus is active (NBACT is a latch set by START and cleared by the subsequent ACK). If NBACT is true (the bus is already active) the machine returns to state A to try again. If the bus is inactive, a bus cycle can begin, so STARTDREN (start drive enable, a signal that will cause the nubus START signal to be asserted in the next clock period) is asserted. At this point, three types of cycles are possible. The first type is an audio cycle, which takes precedence over all others. This precedence is somewhat arbitrary, but audio cycles happen at a rate of approximately one long word for every other scan line. Therefore an audio cycle will not significantly delay video cycles. Video cycles, however, could possibly hold off an audio cycle indefinitely. The other types of cycles are a block read of background data and a block write of video data. For an audio cycle the signal P-TMDR<1> (pre transfer mode 1, a signal that causes the nubus transfer mode line TM<1> to be asserted in the next clock period) is always asserted because audio cycles are always write cycles. For the nubus computer bus, the signal TM<1> is roughly equivalent to the read/write signal of many bus systems. If the "ATMOEN" (audio transfer mode 0 enable), the signal is generated by the audio logic when it wants to write a single byte. For nubus TM<0> flags a byte sized cycle signal is true, P-TMDR<0> (pre transfer mode 0, a signal that will cause the nubus transfer mode line TM<0> to be asserted in the next clock period) is asserted. State E is the nubus START cycle of the audio transfer. In state E, the "ENODIR" (enable output direction) signal is asserted to keep the nubus bus buffers direction pin such that it will keep driving data out on the bus. Initially the PADEN signal, asserted following state A, makes the direction switch for the address portion of the cycle). The ENODDIR signal keeps the buffers in the "output" direction for the DATA portion of the cycle (e.g., after START is asserted). The "AADEN" (audio address enable) signal ensures that the multiplexer 116 is driving sampled audio data. State F is waits for the ACK (nubus acknowledge) signal to be asserted by the addressed slave device, indicating the end of the audio cycle. Then, a check is made to determine whether a new GRV is valid. If so, PADEN is asserted because a new bus cycle will be started immediately after this one ends. The next cycle in the preference order is the block read cycle (the read portion of a block read/modify/write cycle). A read cycle is only performed if the READRQ signal was set by the block info FIFO read state machine of FIGS. 8a and 8b. If a READRQ is set, the machine goes to state G. This is the nubus START cycle of the block read. The signals P-TMDR<1>, P-TMDR<0>, and ENODIR are not asserted for a video read because read cycles are never byte-sized and because the bus buffers must change direction to become inputs again, so that data may be read. In state G the "WRQ" (wait required) signal is set. WRQ is a flip flop that will cause a one clock wait cycle to be added after the block read and before the video write cycle to ensure that the 'fall through' time of the read FIFOs has passed. If there is more than one long word in the block i.e., if block transfer is being used, the wait happens during the later cycles of the block transfer. State H waits for the nubus ACK signal to be asserted by the addressed slave if the signal TM<0> (intermediate long word acknowledge within the block) is asserted without ACK. If so, the "WRQ" signal is cleared. Since there has to be at least one more clock in this cycle if ACK is not yet asserted, a wait cycle is not required. Each time TM<0> is asserted the read FIFO is written by asserting the "RFWEN" (read FIFO write enable) signal. The "PADEN" signal is not asserted because a new bus cycle is not going to follow this one. A video write must follow this cycle before a new cycle can be initiated. State I is the wait state, which is entered if WRQ is set.

The last type of cycle is a video write cycle. This will happen if no other cycle type has precedence or if a read cycle has just been completed. Just before state J, the signals P-TMDR<1> (about to do a nubus write) and P-SHIFT (pre shift, which causes the first long word of data to be read out of the data FIFO) are asserted. State J is the nubus START cycle of the video write cycle. ENODIR is asserted to keep the bus buffers in the output direction. LDBCNT and BLKCNTEN load a counter in bus arbitration and control logic module 179, ready to count the long words in this block. DSAD-COUNTEN increments the destination address counter 154 to count the first long word read from the data FIFOs. RUN-SHIFT enables the programable array logic that reads the data FIFO 123 to read it when ONM and TM<0> are both true, to ready the next long word of data when the previous long word of data is about to be used. State K waits for ACK to be asserted by the addressed slave and keeps the "RUNSHIFT" signal asserted to keep the video data valid. If GRV is set PADEN is asserted to prepare the next cycle. If ACK is not asserted, and TM<0> (intermediate acknowledge) is asserted, both the block and destination address counters 143, 154 must be incremented. When ACK is asserted by the addressed slave, it ends the bus cycle. At that time, BLKEND is tested, and if false the BLKERR (block error) latch is set. This indicates that the wrong number of 32 bit words were transferred. If the correct number of 32 bit words were transferred, the end of the cycle would be coincident with the end of a block (indicated by BLKEND). This is necessary because a nubus slave that does not support block transfer is supposed to assert ACK immediately without a bus error condition. The block error latch is therefore the only indication to the driver software that the addressed slave is not a block transfer board.

Many contemporary television programs and VCR tape programs include a signal that contains the text of the dialog of the program. This signal, called closed captioning, has numerous applications for hearing-impaired viewers, and the like, and has particularly useful applications with computers. Also, color calibration, accurate time, and teletext information associated with television program signals are particularly useful with computers. Such data and information is sent in this vertical interval of the NTSC signal. For home viewing of television signals containing such data and information, a caption decoder box is used to decode textual information appearing on video line 21 of the analog television signal and display the associated text over the program picture on the display screen. In an embodiment of the invention, this textual information is captured and can be logged to a file as a transcript of a program, or can be used as a textual index to video information that may be captured on tape or disk.

Not all video sources include captioning. When no captioning is available, no attempt is made to interpret the signal on line 21. Thus, referring now to FIG. 18, closed captioning may be sensed in response to identifying seven bursts of white at the beginning of the line which is then scanned for text and other information. A line of captioning may include up to 2 8-bit codes for a transmission rate of 60 characters per second. The captioning is decoded every frame to avoid missing any characters. If video reception is suspended or interrupted momentarily, closed-captioning is suspended or interrupted also, and data thus lost while logging to a file is designated with an asterisk "*" as a flag of possible missing data. The decoded text may be stored in a text buffer memory for diverse uses at the election of a computer operator. For example, the decoded text may be searched for a particular word or phrase which, when found, would cause the associated video signal to be automatically displayed in a window on the user's computer display system.

Figure 18:
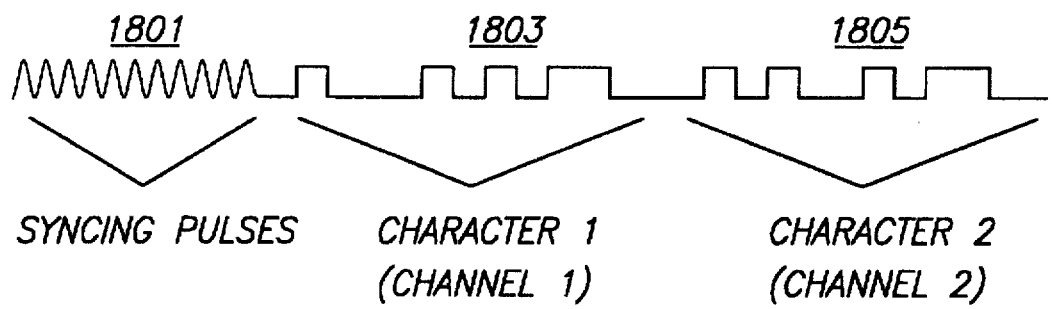
FIG. 18 is a graph showing closed-captioning signals on video line number 21.
Figure 19:
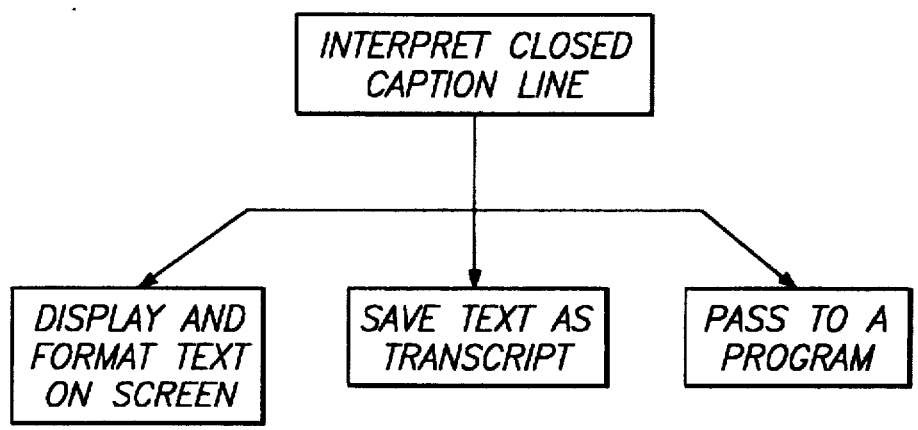
FIG. 19 is a chart illustrating use of closed captioning information.
Figure 20:
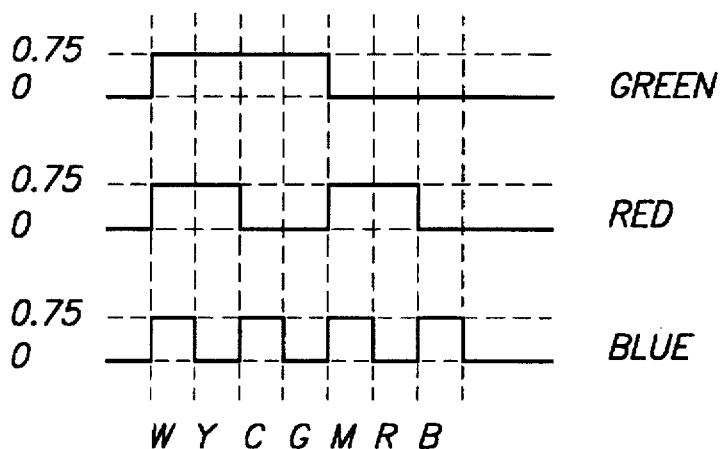
FIG. 20 is a graph illustrating timing of color bar information on video line number 17.

Specifically, and with reference to FIGS. 18–20, the present invention digitizes and stores video line 21 of every frame into memory on the frame buffer (off screen or on screen memory). The video line 21 is encoded into 16 or 24 bit RGB or 8-bit indexed RGB information. The line can then be read as digital RGB values directly (or through a color look-up table in the 8-bit case). The initial seven bursts 1801 allow a detector to synchronize to the frequency and phase of the captioning signal, as illustrated in FIG. 18. The threshold is also sampled to determine white and black levels (i.e., binary on and off conditions), and the digital data in 2 8-bit codes 1803 and 1805 that follow (and that form channels 1 and 2) can be detected in conventional manner. Also, several samples of each data bit are taken and averaged to enhance the immunity to noise. The two resulting bytes of information are converted through code tables that map the bytes to ASCII characters for use in the computer. Some codes not for display include formatting information, and color and character attribute codes. Thus, as illustrated in FIG. 19, the captioning information can be used to display captioning text on the video as it is being displayed, and to log the text as an index to the video being processed, and to integrate into operational programs of a computer (see enclosed Appendix).

The vertical interval of television signals also includes a color bar at line 17 of the analog video signal that provides standard color references. This line of data can be digitized and stored as pixels of red, green and blue components. The blue component of this line can be used to set the hue, saturation, contrast and brightness of the displayed picture as accurately as possible on an RGB display system.

Referring to FIG. 20, seven color bars are presented in line 17. These are, in order, white (RGB), yellow (RG), Cyan (GB), green (G), magenta (RB), red (R) and blue (B). The blue component of each of these colors is looked at. First, the brightness is adjusted to be just above the black level on any of the even numbered bars (those without a blue component). In other words the blue component count is set between 0 and 1. Second, the contrast is adjusted on the white bar (#1) such that it is not clipped off at the high end. The present invention digitizes the blue component, for example, with 5 bits of precision, the digital level of the blue component is therefore adjusted between levels such as 23 and 24 ($0.75*(2^5-2)$ and $(2^5-1)$). Third, the color level is adjusted on the blue bar (#7) to maximize it without clipping (between 23 and 24). Fourth, the hue control is adjusted so that blue component counts for the cyan (#3) and magenta (#5) bars are made equal. Again, a standard video source is digitized and stored in memory so that the information can be read, interpreted and processed to improve the computer-video interaction.

Each frame of video is also encoded with source information on video line 20. This information may include the origin of the broadcast, network, date, and a time stamp. This information can be extracted and presented to the user. The network identification can be shown as the user flips through the stations. The time can be read and used by the computer to reset the correct time on the internal clock of the computer, or provide the user with a display of time directly on the computer display. Likewise, the date can be read to determine the original broadcast date for a video broadcast that is recorded in a file.

Also each frame contains teletext information in lines 10 through 16. This is digital information that can be transmitted while a normal broadcast is underway. Again this information can be decoded and presented to the user for viewing, storage or manipulation by the computer.

All such closed-captioning requires an additional 2K bytes of block transfer memory on the numbers described above, and can be handled during the vertical blanking interval in the associated computer.

Therefore, a method and apparatus for transmitting video data over a standard personal computer data bus is provided by selecting video data for transmission, parsing the data into blocks and selectively storing and addressing the data blocks.

Channels

Two channels are defined in closed-captioning. To distinguish between the two channels, these constants are given:

```
Pascal
    CCChannel1 = 1;
    CCChannel2 = 2;
C
    #define CCChannel1 1
    #define CCChannel2 2
```

Size

The captioning area on a television screen is divided into 15 rows by 32 columns for text display. Based upon a 640×480 screen, the top of row 1 begins 85 lines from the top and the bottom of row 15 is line 474 giving 390 lines. The left and right margins are roughly 60 pixels each or indented about 10%.

Modes

TextMode—When in text mode, the full captioning area is blacked-out and text is placed on screen until a caption signal is not present or another mode is started. No video shows through anywhere within this block. Initially the text begins in position 1 of row 1 and continues to the right until a new text packet is received which moves the "cursor" to position 1 of the next row. When row 15 is reached, all rows of text are scrolled up and the new text is placed on row 15 and continues in this format until the end condition. A TextRestart command should erase all characters on the screen. Mid-row control codes for new rows are ignored.

PaintOnMode—N/A

PopupMode—The entire data set received is placed on the screen according to imbedded formatting and style codes. Only the areas covered by text are blacked-out. All previous captions are erased from the screen. Only rows 1–4 and 12–15 are used. It is not possible for text to be sent to the other lines. Mid-row control codes are used.

RollupMode2, RollupMode3, and RollupMode4—These modes display 2, 3, or 4 rows using rows 14–15, 13–15, and 12–15 respectively. When the first line is received, it, like in TextMode, begins in the first column of the first displayed row and each new line of text is placed on the next row until the last displayed row is reached, at which time, the other rows are scrolled up to make room for the new line. According to closed-captioning definition, the last four lines are always stored in memory even though fewer than 4 lines may be shown. Thus when going from RollupMode2 to RollupMode4 the screen will switch from showing the last two lines to showing the last 4 lines received. The developer will be responsible to save these lines for display. Mid-row control codes are not used in this mode.

The mode in use will be passed along with the channel and line of data in the CCReady function. Defined constants for these modes are as follows:

```
Pascal
    CCPopupMode = 1;
    CCRollupMode2 = 2;
    CCRollupMode3 = 3;
    CCRollupMode4 = 4
    CCTextMode = 5;
    CCPointOnMode = 6;
C
    #define CCPopupMode 1
    #define CCRollupMode2 2
    #define CCRollupMode3 3
    #define CCRollupMode4 4
    #define CCTextMode 5
    #define CCPaintOnMode 6
```

Formatting Codes

Imbedded in the text are formatting codes.

Row codes direct the cursor to the beginning of the specified row and character styles return to normal white text.

Indent codes tell the cursor to move horizontally the number of columns specified. In PopupMode and PaintOnMode this area jumped will be transparent showing video.

Style codes exist to change the color of the text, underline the text, and set it in italics. They are prioritized in that color being the highest turns off italics and underline, italics turns off underlining, and underlining affects nothing else.

The music note is unique in that no character in normal fonts represents a musical note. The note is used frequently in captioning when music is playing, thus should not be ignored. The character is coded as a bullet "•", which is how it will be displayed if no other character is used.

```
Pascal
    CcRow1 = $91;
    CCRow2 = $93;
    CCRow3 = $95;
    CCRow4 = $98;
    CCRow12 = $9A;
    CCRow13 = $9B;
    CCRow14 = $9C;
    CCRow15 = $9D;
    CCindent0 = $E0;
    CCIndent1 = $E1:
    CCIndent4 = $E4;
    CCIndent8 = $E8;
    CCIndent12 = $EC;
    CCIndent16 = $F0;
    CCIndent20 = $F4;
    CCIndent24 = $F8;
    CCIndent28 = $FC;
    CCWhiteText = $C1;
    CCGreenText = $C2;
    CCBlueText = $C3;
    CCCyanText = $C4;
    CCRedText = $C5;
    CCYellowText = $C6;
    CCMagentaText = $C7;
    CCItalicsText = $C8;
    CCUnderline = $8B;
    CCMusicNote = $A5;
C
    #define CCRow1 0x91
    #define CCRow2 0x93
    #define CCRow3 0x95
    #define CCRow4 0x98
    #define CCRow12 0x9A
    #define CCRow13 0x9B
    #define CCRow14 0x9C
    #define CCRow15 0x9D
    #define CCIndent0 0xE0
    #define CCIndent1 0xE1
    #define CCIndent4 0xE4
    #define CCIndent8 0xE8
    #define CCIndent12 0xEC
    #define CCIndent16 0xF0
    #define CCIndent20 0xF4
    #define CCIndent24 0xF8
    #define CCIndent28 0xFC
    #define CCWhiteText 0xC1
    #define CCGreenText 0xC2
    #define CCBlueText 0xC3
    #define CCCyanText 0xC4
    #define CCRedText 0xC5
    #define CCYellowText 0xC6
    #define CCMagentaText 0xC7
    #define CCitalicsText 0xC8
    #define CCUnderline 0x8B
    #define CCMusicNote 0xA5
```

APPENDIX A

```
* File GrabberInit.a
******************************************************************
*
* Radius Grabber Init
*    written by George Cossey Oct 21, 1988 - Dec 31, 1989
*    and Terry Worley Jan 1, 1990 - present
*
*    This is the INIT that installs the Radius Grabber Driver.
*
* Modification History:
*
* 10/21/88 GRC, Original
* 02/15/89 GRC, Added support for second prototype board.
* 03/08/89 GRC, General cleanup
* 05/23/89 GRC, Alpha version without the tuner.
* 10/05/89 GRC, Alpha version with the I2C tuner and controls
* 03/18/90 TW, v1.0b1 Major revisions throughtout the code up to this point.
* 03/26/90 TW, Added color startup icon support. Check for 32BitQD.
*
******************************************************************
    MAIN
    BLANKS ON
    STRING ASIS
    MACHINE MC68020
    MC68881
    PRINT OFF
    INCLUDE 'SysEqu.a'
    INCLUDE 'QuickEqu.a'
    INCLUDE 'Private.a'
    INCLUDE 'SlotEqu.a'
    INCLUDE 'ROMEqu.a'
    INCLUDE 'VideoEqu.a'
    INCLUDE 'ToolEqu.a'
    INCLUDE 'Traps.a'
    INCLUDE 'SysErr.a'
    INCLUDE 'Sound.a'
    INCLUDE 'PackMacs.a'
    PRINT ON
; Our own equates
    INCLUDE 'GrabberEqu.a'
;
;Here is the code for the INIT resource.
StartOfInit
    bra.s Begin
;This will place a copyright notice right in our code.
    STRING Pascal
DrGrabberTitle dc.b '.RadiusGrabber'
    STRING ASIS
VersionStr dc.b '1.0b16' ;Current driver version
Copyright dc.b 'Copyright ®1990 Radius Inc.'
    dc.b 'Written by Terry Worley'
Begin _HLock ;A0 coming in has a handle to us
    link a6,#-384 ;allocate buffer for pBlock and file name
    movem.l d3-d6/a2-a5,-(a7) ;save work regs
    ;If command key is down, don't install
    btst #7, KeyMap+6 ;comand key down?
    bne NoInstall ; Yes -> Don't install
    bsr StopCheck
;
;Make sure 32Bit QuickDraw is present.
    move.w #QD32BitTrap, d0 ;Check the Jackson Pollock trap.
    _GetTrapAddress ,newTool
    move.l a0,a1
    move.w #UnimpTrap,d0
```

APPENDIX B

| Options | File (by build order) | Size | Volume |
|---|---|---|---|
| | Interface.lib | 10098 | Apps:ThinkPascal |
| | DRVRRuntime.lib | 2948 | Apps:ThinkPascal:Libraries |
| D N V R | VideoCtrl.p | 5534 | Sources::LSPRadiusInterface |
| D N V R | SysEqu.p | 0 | Apps:ThinkPascal:Interfaces |
| D N V R | Video_WindSize.Pas | 0 | Sources:Video:TheatreDA |
| D N V R | Video_Common.Pas | 0 | Sources:Video:TheatreDA |

-continued

APPENDIX B

| Options | File (by build order) | Size | Volume |
|---|---|---|---|
| D N V R | Utilities.Pas | 1568 | Sources:Video:TheatreDA |
| D N V R | ChannelNum.Pas | 2458 | Sources:Video:TheatreDA |
| D N V R | DAContents.Pas | 6974 | Sources:Video:TheatreDA |
| D N V R | CalcWindowSize.Pas | 644 | Sources:Video:TheatreDA |
| D N V R | OverlayDA.Pas | 702 | Sources:Video:TheatreDA |
| D N V R | ClosedCaption.p | 2616 | Sources:Video:TheatreDA |
| D N V R | Commands.p | 5386 | Sources:Video:TheatreDA |
| D N V R | SlideIt.Pas | 1212 | Sources:Video:TheatreDA |
| D N V R | ScanChannels.Pas | 1076 | Sources:Video:TheatreDA |
| D N V R | Clip_Save.Pas | 2190 | Sources:Video:TheatreDA |
| D N V R | SeekToChannel.Pas | 606 | Sources:Video:TheatreDA |
| D N V R | PanelSwitches.Pas | 926 | Sources:Video:TheatraDA |
| D N V R | WhereHit.Pas | 6608 | Sources:Video:TheatreDA |
| D N V R | VideoDA.Pas | 5872 | Sources:Video:TheatreDA |
| | Total Code Size | 57418 | |

We claim:

1. In a computer having a central processing unit, a video processing subsystem, and a main data bus not dedicated to video data transfer connected to the central processing unit and the video processing subsystem, a method for transmitting digital video data at a real time video rate over the main data bus in a block transfer mode, the method comprising the steps of:

selectively choosing portions of the video data based on satisfaction of a first set of criteria;

parsing the selected portions of the video data into blocks;

storing the blocks in a memory device;

assigning a data address corresponding to each one of the blocks; and selectively transmitting ones of the blocks to the corresponding assigned addresses over the main data bus in said block transfer mode, based on satisfaction of a second set of criteria, thereby resulting in transmission of said digital video data at said real time video rate.

2. A method as in claim 1 wherein the first set of criteria comprises a criterion that the portions of the video data are chosen responsive to a predetermined time interval following a given event.

3. A method as in claim 2 wherein the given event is a synchronization pulse of a video signal.

4. In a computer having a central processing unit, a video processing subsystem, and a main data bus not dedicated to video data transfer connected to the central processing unit and the video processing subsystem, a method for transmitting digital video data at a real time video rate over the main data bus in a block transfer mode, the method comprising the steps of:

selectively choosing portions of the video data based on satisfaction of a first set of criteria;

parsing the selected portions of the video data into blocks;

storing the blocks in a memory device;

assigning a data address corresponding to each one of the blocks, the assigned address being an address of a frame buffer of a computer display system; and selectively transmitting ones of the blocks to the corresponding assigned addresses over the main data bus in said block transfer mode, based on satisfaction of a second set of criteria, thereby resulting in transmission of said digital video data at said real time video rate.

5. A method as in claim 4 wherein the first set of criteria comprises a criterion that the portions of the video data are chosen responsive to a desired display size on the computer display system.

6. A method as in claim 4 wherein the second set of criteria comprises a criterion that ones of the blocks are transmitted responsive to the position and location of display elements on the computer display system.

7. A method as in claim 6 wherein the display elements comprise a display window.

8. A method as in claim 6 wherein the display elements comprise a cursor.

9. A method as in claim 4 wherein the second set of criteria comprises a criterion that ones of the blocks are transmitted only responsive to correspondence of those blocks to portions of an image not covered by overlapping display elements.

10. A method as in claim 4, further comprising associating a block control word with each of said blocks, said block control word having a first segment indicating whether any part of the corresponding block represents video that is visible, and a second segment indicating whether any part of the corresponding block represents video that is invisible, wherein the second set of criteria comprises a criterion that ones of the blocks are transmitted without further processing responsive to said first segment indicating that some of the corresponding block represents video that is visible and the second segment indicating that none of the corresponding block represents video that is invisible.

11. A method as in claim 10, wherein the second set of criteria comprises a criterion that ones of the blocks are transmitted after further processing responsive to said first segment indicating that some of the corresponding block represents video that is visible and the second segment indicating that some of the corresponding block represents video that is invisible.

12. In a computer having a central processing unit and a main data bus not dedicated to video data transfer operatively connected to the central processing unit, apparatus for transmitting video data over the main data bus at a real time video rate in a block transfer mode, the apparatus comprising:

a digitizer producing a digitized representation of the video data;

a parser operatively connected to the digitizer to create blocks of the digitized video data;

a processor operatively connected to the parser to selectively choose ones of the blocks based on satisfaction of display requirements;

a register operatively connected to the processor to store the ones of the blocks selectively chosen by the processor; and transmission means operatively connected to the register to transmit the ones of the blocks stored in the register over the main data bus to selected addresses, using said block transfer mode, thereby resulting in transmission of said video data at said real time video rate.

13. Apparatus as in claim 12 wherein the display requirements include a desired size for display of the video data.

* * * * *